(12) United States Patent
Inaba

(10) Patent No.: US 7,150,654 B2
(45) Date of Patent: Dec. 19, 2006

(54) ADAPTER DEVICE

(75) Inventor: Takeshi Inaba, Kanagawa (JP)

(73) Assignee: Sony Corporation (JP)

( * ) Notice: Subject to any disclaimer, the term of this patent is extended or adjusted under 35 U.S.C. 154(b) by 13 days.

(21) Appl. No.: 10/491,331

(22) PCT Filed: Jul. 8, 2003

(86) PCT No.: PCT/JP03/08664

§ 371 (c)(1),
(2), (4) Date: Apr. 1, 2004

(87) PCT Pub. No.: WO2004/015621

PCT Pub. Date: Feb. 19, 2004

(65) Prior Publication Data

US 2004/0266267 A1 Dec. 30, 2004

(30) Foreign Application Priority Data

Aug. 8, 2002 (JP) ............................. 2002-231850

(51) Int. Cl.
*H01R 24/00* (2006.01)
(52) U.S. Cl. ...................................... 439/630
(58) Field of Classification Search ............... 439/630, 439/108, 607, 92, 34, 946, 159, 152; 361/737, 361/792
See application file for complete search history.

(56) References Cited

U.S. PATENT DOCUMENTS 6,176,721 B1* 1/2001 Gottardo et al. ............ 439/260
6,435,409 B1* 8/2002 Hu .............................. 235/441
6,524,137 B1* 2/2003 Liu et al. ..................... 439/638
6,780,062 B1* 8/2004 Liu et al. ..................... 439/630
2004/0042323 A1 3/2004 Moshayedi
2004/0235354 A1* 11/2004 Takahashi ................... 439/630
2005/0090151 A1* 4/2005 Laity et al. .................. 439/607

FOREIGN PATENT DOCUMENTS

| DE | 196 48 767 | 6/1997 |
|---|---|---|
| EP | 1 006 479 | 6/2000 |
| EP | 1 098 394 | 5/2001 |
| EP | 1 102 172 | 5/2001 |
| JP | 5-60060 | 8/1993 |
| JP | 6-51867 A | 2/1994 |
| JP | 6-195524 A | 7/1994 |

(Continued)

OTHER PUBLICATIONS

International Search Report dated Oct. 28, 2003.

(Continued)

*Primary Examiner*—J. F. Duverne
(74) *Attorney, Agent, or Firm*—Rader, Fishman, & Grauer PLLC; Ronald P. Kananen

(57) ABSTRACT

An adapter device is provided in which a variety of IC cards having different functions is receivable. The adapter device comprises a device body (21) having an IC card insertion slot (27) formed at a side thereof and a receptacle (46) formed contiguously to the IC card insertion slot (27) and into which an IC card (4) is to be set, a cover member (22) provided over one main side of the device body (21) slidably on the device body (21), an interface for data transfer between an IC card (4) set in the IC card receptacle (46) and a host apparatus (2) and a support member (23) to support the device body (21) by a hinge mechanism (81) at a side opposite to the IC card insertion slot (27) to be pivotable in relation to a surface on which the device body (21) is installed.

2 Claims, 14 Drawing Sheets

FOREIGN PATENT DOCUMENTS

| | | |
|---|---|---|
| JP | 10-149446 A | 2/1998 |
| JP | 2764503 B2 | 4/1998 |
| JP | 10-222633 A | 8/1998 |
| JP | 2001-176254 | 6/2001 |
| JP | 3250986 B2 | 11/2001 |
| JP | 2002-501259 A | 1/2002 |
| WO | WO 99/38104 A1 | 7/1999 |
| WO | WO 00/13089 A1 | 3/2000 |
| WO | WO 00/21439 | 4/2000 |
| WO | WO 03/102752 | 12/2003 |

OTHER PUBLICATIONS

Supplementary EPO Search Report mailed Apr. 27, 2006.

U.S. Appl. No. 60/384,885, Moshayedi.

* cited by examiner

ADAPTER DEVICE

TECHNICAL FIELD

The present invention relates to an adapter device in which there can be set an IC card as a feature expansion module for an information processing apparatus as a host apparatus.

This application claims the priority of the Japanese Patent Application No. 2002-231850 filed on Aug. 8, 2002, the entirety of which is incorporated by reference herein.

BACKGROUND ART

Conventionally, an information processing apparatus such as a personal computer or the like has connected to the connector thereof an adapter device in which a memory IC card used as an external storage unit can be set or the like as the case may be. The connection of the adapter device to the connector of the information processing apparatus is made by a USB interface, for example. By operating the information processing apparatus, the user can play back content data such as video data, music data or the like stored in a storage unit in the information processing apparatus by storing the data into an IC card set in an adapter device, setting the IC card having the content data thus stored therein into a portable information processing apparatus and reading the content data from the IC card. The user can thus enjoy the content data anytime and anywhere.

In addition to the memory IC card used as an external storage unit, there is currently available a variety of such modules having different features. The IC cards are used as a feature expansion module for the information processing apparatus as a host apparatus. For example, the IC cards include an access management one which manages the access to the information processing apparatus as a host apparatus by checking the fingerprint, as one of the biological features, of the user trying to access the information processing apparatus. Such IC cards having different features are unified in profile and interface except for their unique-functional portions, and the adapter device has an IC card receptacle in which there can be set any one of a plurality of IC cards of different functions. For example, the fingerprint recognition IC card and memory IC card are similar in profile, outside dimensions, interface and the like to each other but they are partially different from each other. Namely, the fingerprint recognition IC card has a fingerprint detector provided on one main side thereof, while the memory IC card has attached on the main side thereof a label on which its stored content is written down.

Since there is set any one of IC cards having different functions, the adapter device should be designed in profile etc. so that the IC card set therein will not interfere with the operation of the adapter device.

DISCLOSURE OF THE INVENTION

Accordingly, the present invention has an object to overcome the above-mentioned drawbacks of the related art by providing a novel and improved adapter device.

The present invention has another object to provide an IC-card adapter device having a receptacle formed therein for IC cards of different functions and which is designed for the operation thereof not to be degraded by any of the IC cards set in the IC card receptacle.

The present invention has still another object to provide an IC-card adapter device having an IC card receptacle formed therein and designed for the user to easily identify the type of an IC card set in the IC card receptacle.

The present invention has yet another object to provide an IC-card adapter device having an IC card receptacle formed therein and which is designed to permit easy fingerprint recognition when a fingerprint recognition IC card is set in the IC card receptacle.

The above object can be attained by providing an adapter device including according to the present invention:

a device body having an IC card insertion slot formed at a side thereof and a receptacle formed contiguously to the IC card insertion slot and into which an IC card is set;

a cover member provided over one main side of the device body to open and close the main side; and an interface for data transfer between an IC card set in the IC card receptacle and a host apparatus.

Also the above object can be attained by providing an adapter device including according to the present invention:

a device body having an IC card insertion slot formed at a side thereof and a receptacle formed contiguously to the IC card insertion slot and into which an IC card is set;

a cover member provided over one main side of the device body slidably on the device body;

an interface for data transfer between an IC card set in the IC card receptacle and a host apparatus; and a support member to support the device body by a hinge mechanism at a side opposite to the IC card insertion slot to be pivotable in relation to a surface on which the device body is installed.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail below concerning the information processing system using the adapter device according to the present invention with reference to the accompanying drawings.

Figure 1:
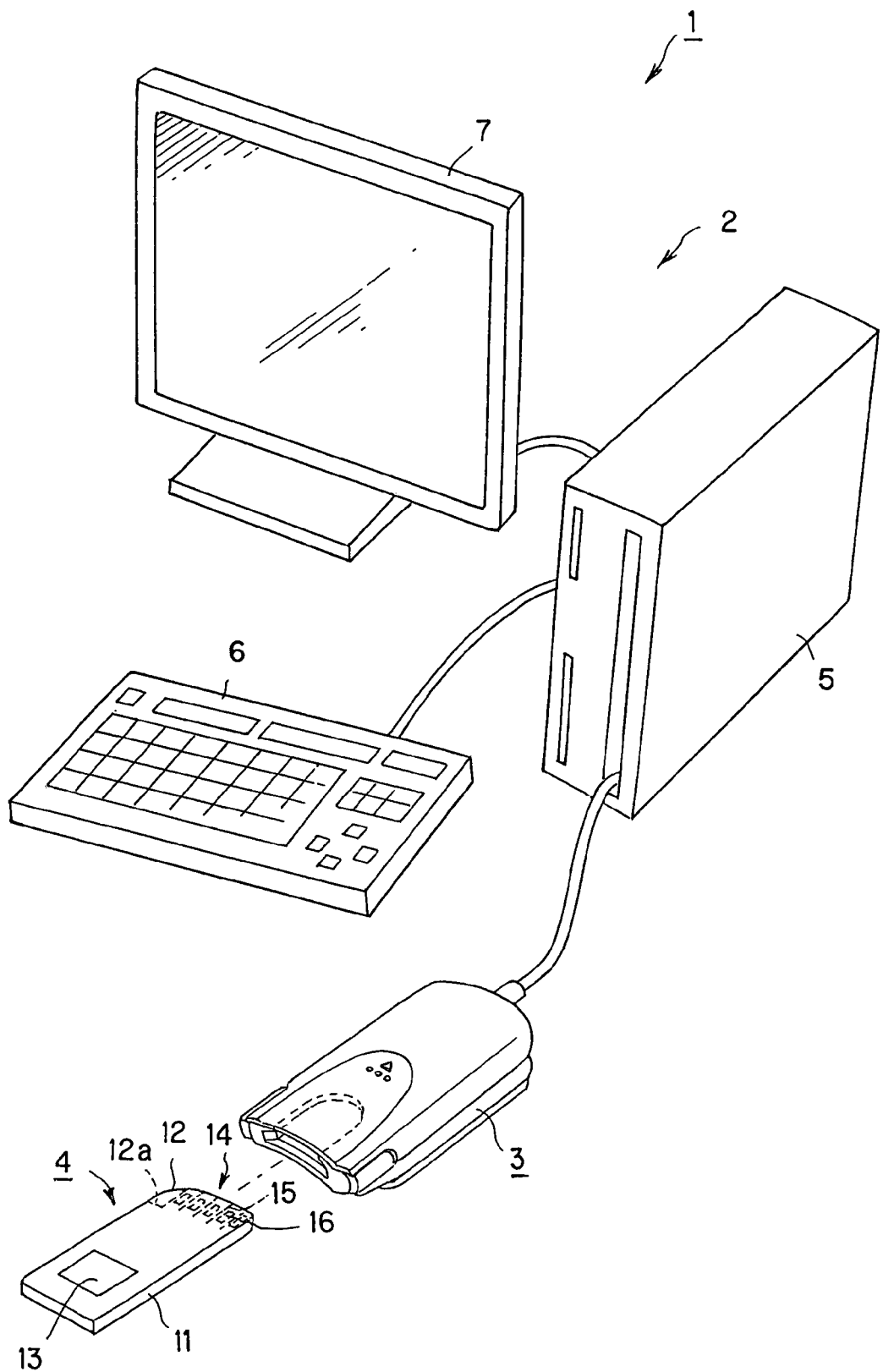
FIG. 1 is a perspective view of an information processing system in which the adapter device according to the present invention is used.

As shown in FIG. 1, the information processing system, generally indicated with a reference number 1, includes an information processor 2 and an adapter device 3 for an IC card 4. The adapter device 2 is to be connected to the information processor 2. The information processor 2 is a stationary or portable personal computer including a main unit 5 having built therein a hard disk drive for storage of various programs and processing data, a ROM (read-only memory) having a control program and the like stored therein, a RAM (random access memory) to which a program and processing data are loaded and a CPU (central processing unit) 5 for controlling the entire system, an input operation unit 6 having a keyboard, ten keys, device and the like connected to the computer main unit 5 to supply the latter with control signals, and a display unit 7 including a CRT (cathode ray tube), LCD (liquid crystal display) or the like, connected to the computer main unit 5 to display the processing data or the like. The computer main unit 5, input operation unit 6 and display unit 7 are connected to one another by cable or air. More specifically, they are connected to one another by an interface such as IEEE (Institute of Electrical and Electronic Engineers) 1394, USB (universal serial bus), RS (recommended standard) 232 or the like. The computer main unit 5 and adapter device 3 are connected to each other by cable or air, for example, by a USB interface. Of course, the adapter device 3 may be connected to the computer main unit 5 by any other appropriate interface such as IEEE 1394, IEEE 802 or the like.

The adapter device 3 connected to the computer main unit 5 has an IC card 4 set therein. The IC card 4 is a fingerprint recognition IC card or a memory IC card, for example. More specifically, the fingerprint recognition IC card 4 includes a generally rectangular card body 11 being a casing formed by molding a synthetic resin. The card body 11 has built therein a printed wiring board having mounted thereon a fingerprint detection sensor and one or more semiconductor elements in which a control circuit and the like are formed. The card body 11 is chamfered at one front-end corner thereof (indicated with a reference number 12) for easy discrimination of a direction in which the user is to insert the IC card into an IC card receptacle in the adapter device 3. At the rear end opposite to the chamfered front-end corner 12, there is a concavity 12a. The chamfered corner 12 and concavity 12a provide a position limiter for the IC card 4 going to be inserted into the IC card receptacle in the adapter device 3. Also, the card body 11 has provided at the upper rear end thereof a fingerprint detector 13 to which the user is to press the fingertip for detection of the user's fingerprint. The card body 11 has formed at one short-side end thereof, namely, at the front lower side, a terminal block 14 including a plurality of contacts 16. The terminal block 14 extends from the front end of the card body 11 at which the IC card 4 is first inserted into the IC card receptacle of the adapter device 3 to the bottom. In the terminal block 14, each of the plurality of contacts 16 is provided on the bottom surface of each of engagement concavities 15 defined by partitions. That is, each contact 16 is protected because it is provided on the bottom of the engagement concavity 15. Also, the engagement concavity 15 is open at the front end and bottom of the card body 11. A connecting terminal 47 provided at the adapter device 3 is to come into the engagement concavity 15 as the IC card 4 is inserted into the IC card receptacle. When each contact 16 is pressed to a corresponding connecting terminal 47, they are electrically connected to each other. That is, the IC card 4 is electrically connected to the adapter device 3.

Note that the IC card 4 set in the adapter device 3 as above may be a memory IC, an IC card with an image pickup device such as CCD (charge-coupled device), an IC card with GPS (global positioning system), an interface IC card for a radio communication such as Bluetooth or the like in addition to the fingerprint detection IC. Namely, the function of the IC card is not limited to any special one.

Figure 14:
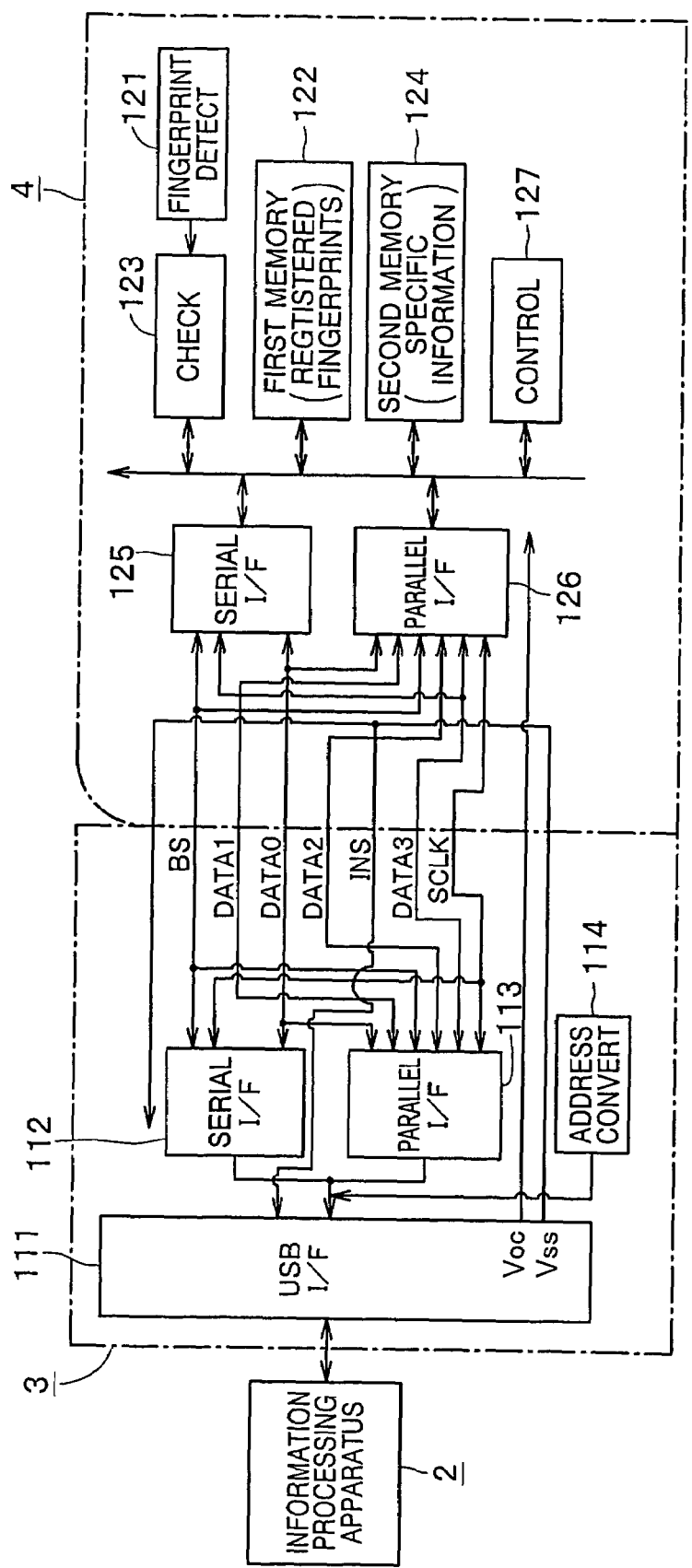
FIG. 14 is a block diagram of an fingerprint recognition IC card.
Figure 17:
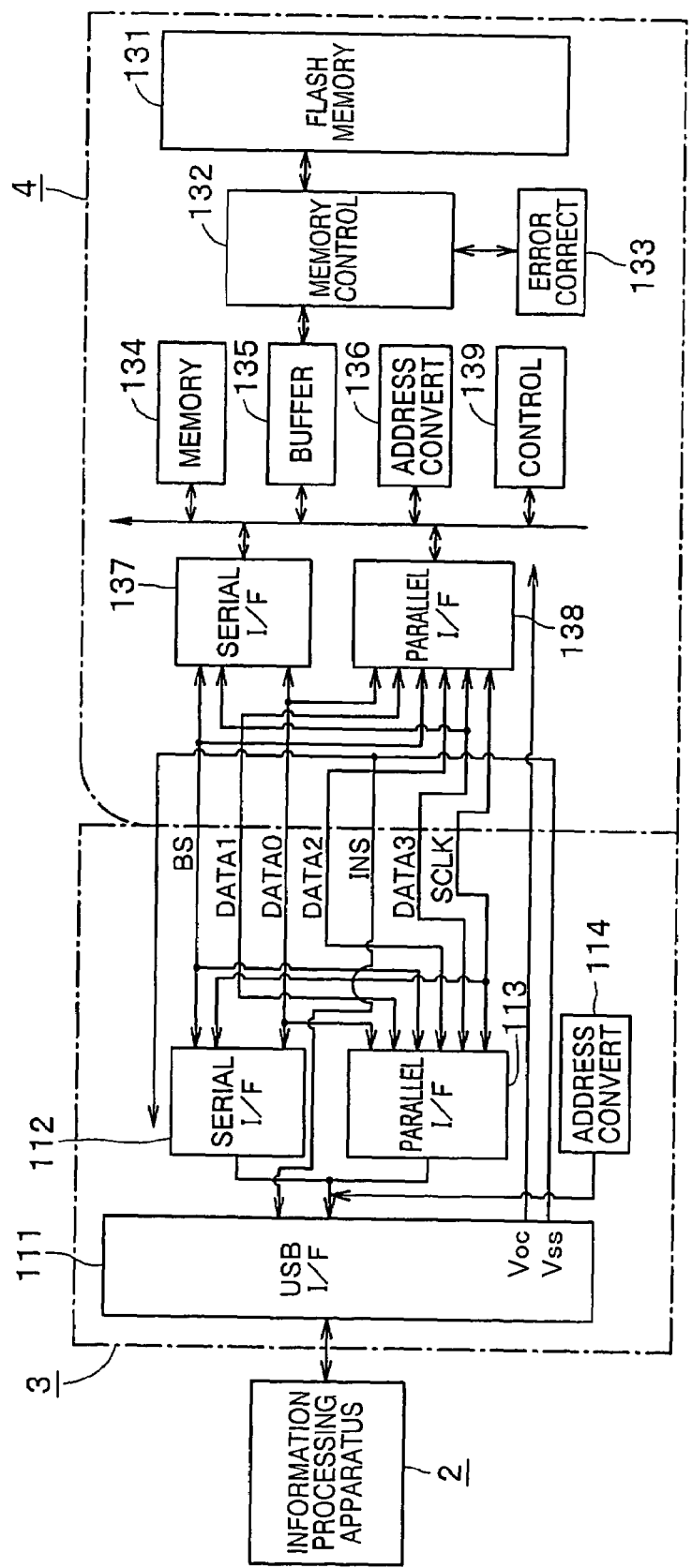
FIG. 17 is a block diagram of a memory IC card.

The IC cards 4 that can be set in the IC card receptacle of the adapter device 3 include two types of which one is of a serial data transfer type and the other is of a parallel data transfer type. In both the two types of IC cards 4, the terminal block 14 includes ten contacts 16 as shown in FIGS. 14 and 17. In the parallel transfer type IC card 4, the first and tenth contacts are used as Vss contacts. They are connected to each other and also to internal power lines, the second contact is a bus state (BS) signal contact for both serial transfer and parallel transfer. The third contact is to have a first data line (DATA1) for the parallel transfer connected thereto. The fourth contact is to have a data line for the serial transfer and data line (DATA0) for the parallel transfer connected thereto, the fifth contact is to have a second data line (DATA2) for the parallel transfer connected thereto, and the seventh contact is to have a third data line (DATA3) for the parallel transfer connected thereto. Further, the sixth contact is to be connected to the intermediate point between the first and tenth contacts for Vss to detect an IC card 4 set, a clock signal line (SCLK) is to be connected to the eighth contact, and an internal power line (Vcc) is to be connected to the ninth contact.

In the serial transfer type IC card, the fifth and seventh contacts are auxiliary ones, and the third contact is to have the internal power line (Vcc) connected thereto.

Further, the serial transfer type IC cards include an IC card with, and a one without, a function to make conversion between an logical address in data processing and physical address in a flash memory. With the IC card having the logical-physical address converting function being set in the adapter device 3, the computer main unit 5 will access the IC card by a logical address via the adapter device 3, and the IC card 4 access the flash memory through conversion of a logical address into a physical address. With the IC card without the logical-physical address converting function being set in the adapter device 3, when the computer main unit 5 will access the IC card 4 by a logical address, the adapter device 3 convert the logical address into a physical address, and the IC card 4 access the flash memory by the physical address.

Figure 2:
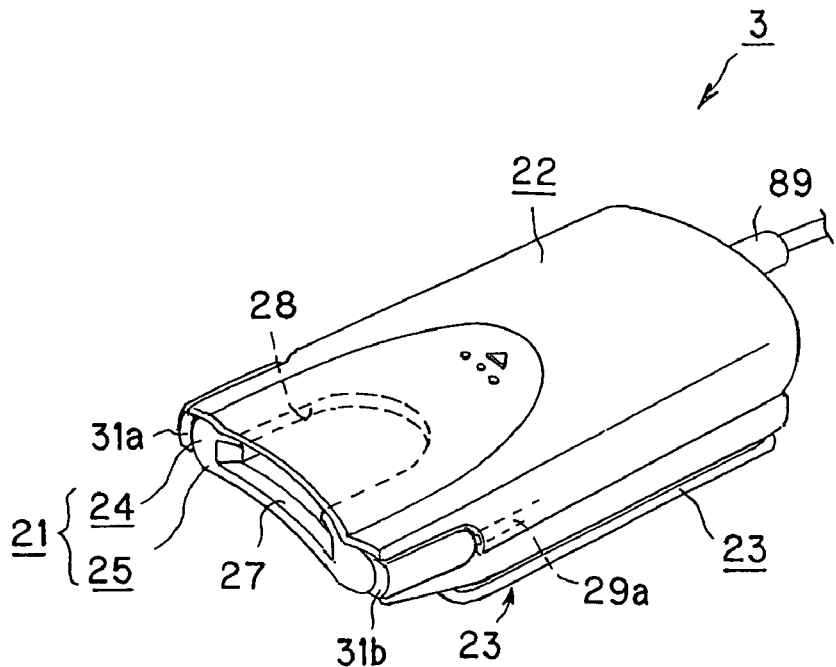
FIG. 2 is a perspective view of the adapter device according to the present invention.
Figure 3:
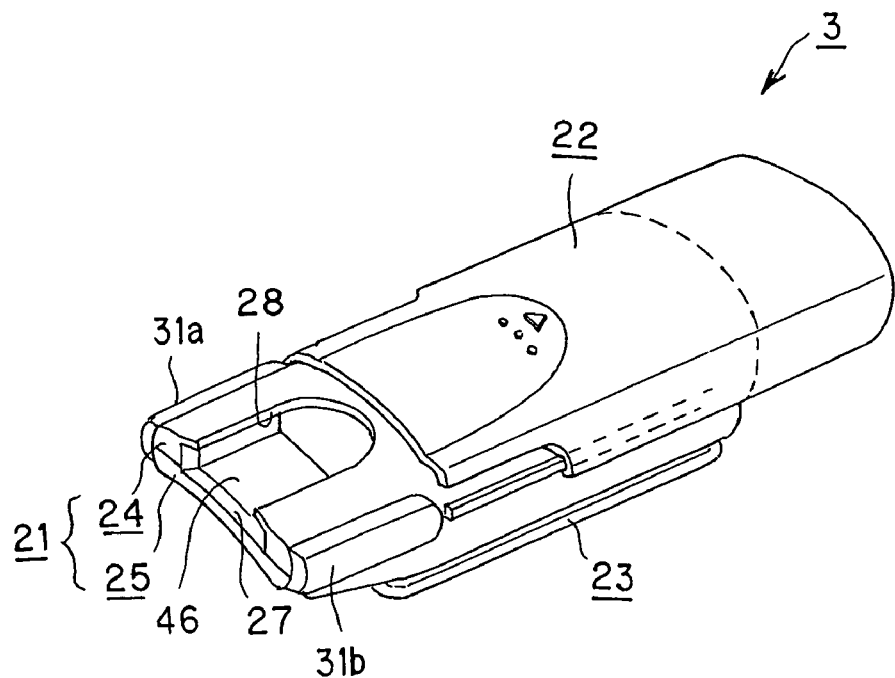
FIG. 3 is a perspective view of the adapter device according to the present invention, with the cover member provided on the device body being in a slid-out position.
Figure 4:
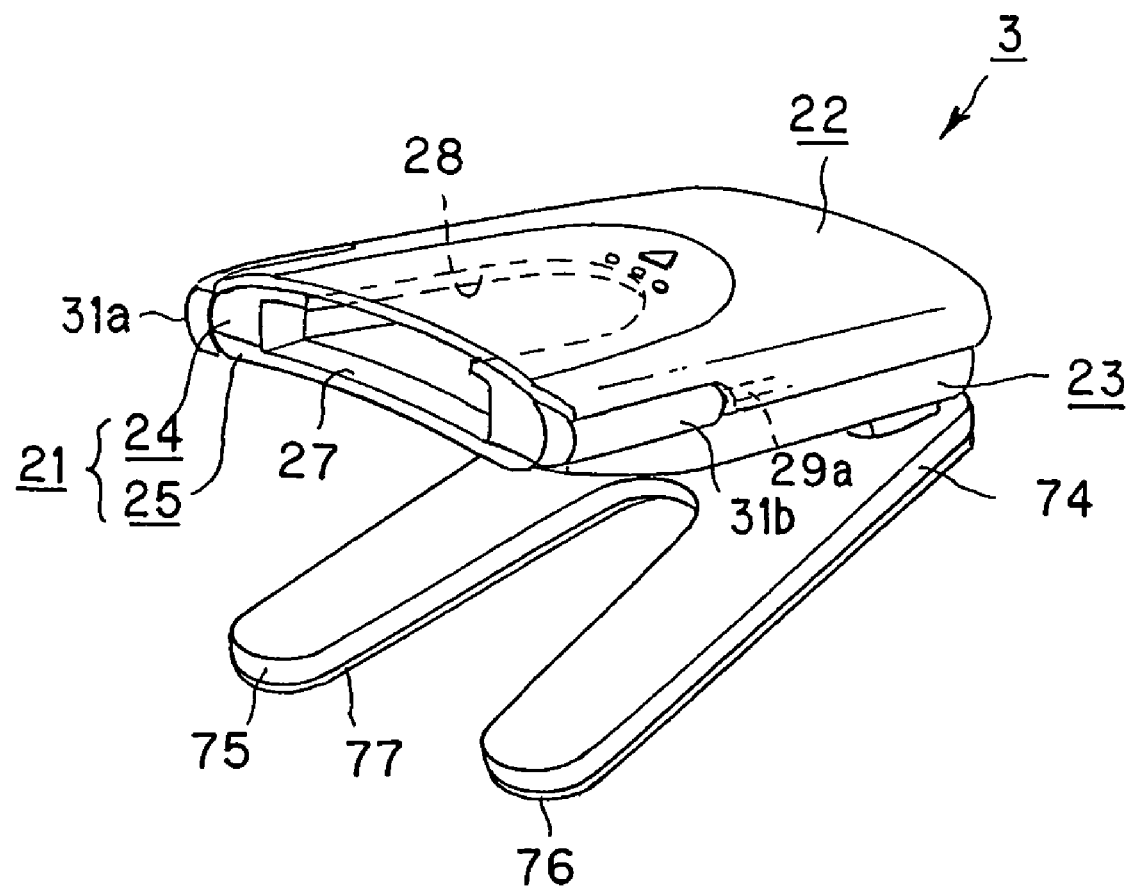
FIG. 4 is a perspective vide of the adapter device, with the device body being pivoted in relation to the support member so that the IC card insertion slot is directed upward.

Next, the adapter device 3 in which the aforementioned IC card 4 is to be set will be illustrated and explained. As shown in FIGS. 2 to 4, the adapter device 3 according to the present invention consists of a body 21 in which the IC card 4 is inserted, a cover member 22 attached to the device body 21 and a support member 23 to support the device body 21.

Figure 5:
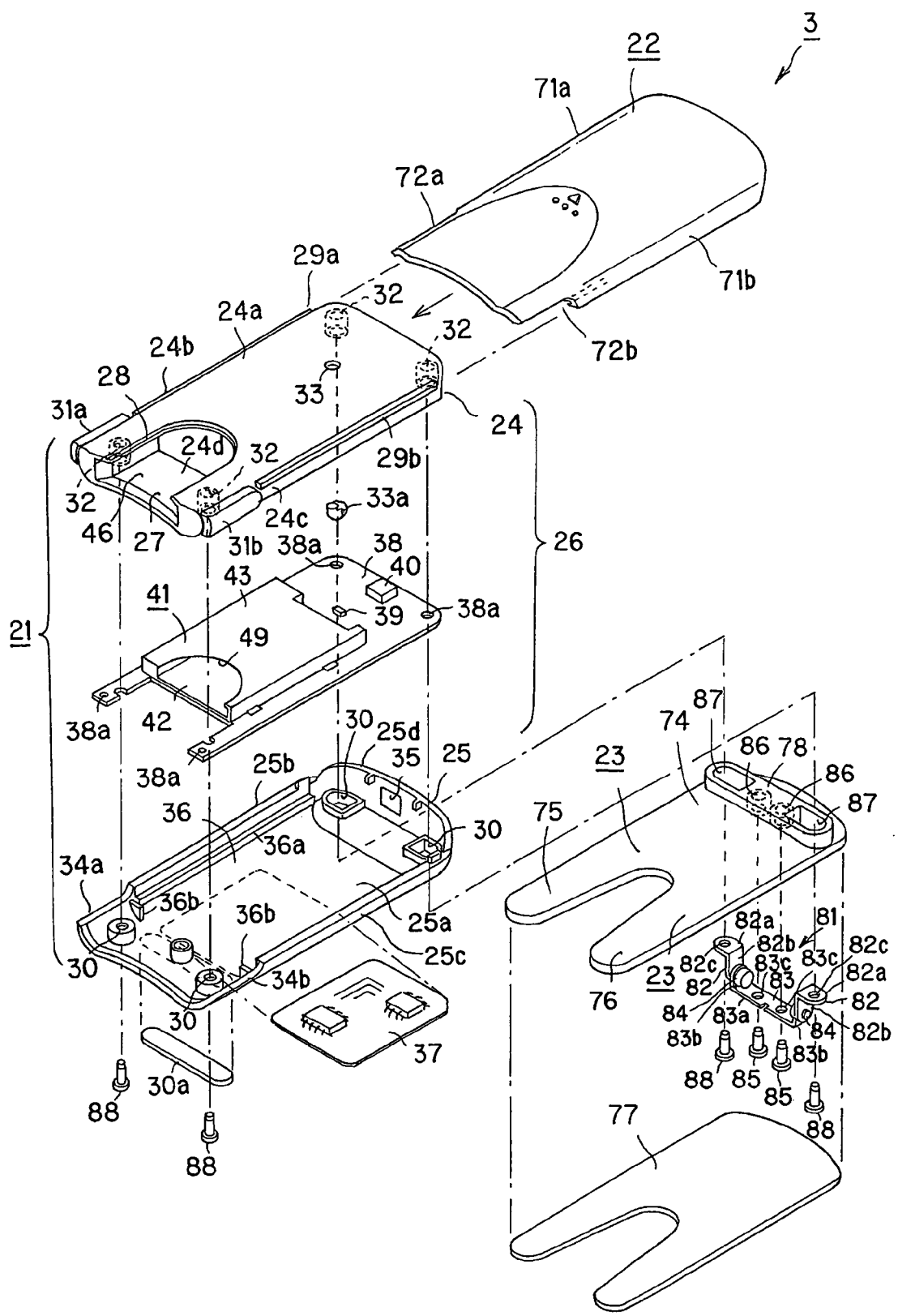
FIG. 5 is an exploded perspective view of the adapter device.

As shown in FIG. 5, the device body 21 includes a generally rectangular casing 26 composed of an upper case 24 and a lower case 25 and having electronic parts etc. housed therein. The upper case 24 is formed generally rectangular by injection molding of a rigid synthetic resin such as ABS (acrylonitrile butadiene styrene) and has aluminum deposited thereon or is otherwise processed to improve the appearance thereof. At the front end as one short side of the upper case 24, there is formed an IC card insertion slot 27 through which the IC card 4 is inserted into the device body 21. Also in the front portion of a main side 24a of the upper case 24, there is formed a generally U-shaped opening 28 which communicates with the IC card insertion slot 27. When the fingerprint recognition IC card 4 is inserted through the IC card insertion slot 27, the fingerprint detector 13 of the IC card 4 is exposed to outside through the opening 28. Also, when the memory IC card 4 is inserted through the IC card insertion slot 27, a label for write-down of the title of stored data is exposed to outside through the U-shaped opening 28.

The upper case 24 includes vertical side wall portions 24b and 24c extending longitudinally of the main side 24a and laterally opposite to each other and a bottom plate portion 24d extending generally parallel to the main side 24a. The bottom plate portion 24d contiguous to the side wall portions 24b and 24c is provided at the front portion of the upper case 24. The inner side of the bottom plate portion 24d forms a part of an IC card receptacle 46 in which the IC card 4 is to be set. The bottom plate portion 24d included in the IC card receptacle 46 has an IC card connector 41 installed thereon to be contiguous to the bottom plate portion 24d.

As mentioned above, the side wall portions 24b and 24c of the upper case 24 extend longitudinally of the main side 24a. Projecting guide rails 29a and 29b are provided on the side wall portions 24b and 24c, respectively. They extend longitudinally along the side wall portions 24b and 24c, respectively, except for the front portions of the latter on which there are provided stoppers 31a and 31b for a cover member 22 which is slidable on the device body 21. The cover member 22 is fitted on the main side 24a of the upper case 24 included in the device body 21 so as to be engaged on the guide rails 29a and 29b from the rear end of the device body 21. When the cover member 22 is fitted, by sliding, on the main side 24a of the upper case 24 of the device body 21 from the rear end, it will abut the stoppers 31a and 31b. Thus the cover member 21 is limited from further going over the stoppers 31a and 31b.

Note that the upper case 24 has formed at each of the four corners of the main side 24a thereof a screw hole 32 in which a set screw 88 for coupling the upper case 24 to the lower case 25 is screwed. In addition, the upper case 24 has formed generally in the center of the main side 24a thereof a hole 33 through which an LED lens 33a disposed above a LED (light emitting diode) which will light during operation of the adapter device 3 will be exposed to outside.

The lower case 25 is formed generally rectangular by injection molding of the same synthetic resin, namely, ABS, as the material use to make the upper case 24. The lower case 25 include vertical side wall portions 25b and 25c extending longitudinally of a bottom plate portion 25a and laterally opposite to each other and a vertical rear wall portion 25d at the rear end thereof. The side wall portions 25b and 25c have formed in the front end portions thereof cuts 34a and 34b, respectively, which receive the stoppers 31a and 31b, respectively. The rear wall portion 25d has formed nearly in the center thereof an opening 35 through which a USB jack 40 for data transfer between the computer main unit 5 and USB interface is exposed to outside. There is formed at each of the four corners of the bottom plate portion 25a a through-hole 30 corresponding to the screw hole 32 in the upper case 24. The bottom plate portion 25a has provided at the front end thereof a cushion member 30a formed from a rubber or the like to prevent the support member 23 of the device body 21 from being fouled.

A compartment 36 for storage of electronic parts is defined inside the lower case 25 composed of the above-mentioned bottom plate portion 25a and side wall portions 25b and 25c. In the compartment 36, printed wiring board supports 36a and 36b are provided on the bottom plate portion 25a along the inner surfaces of the side wall portions 25b and 25c. In the compartment 36, a first printed wiring board 37 is disposed on the bottom plate portion 25a and a second printed wiring board 38 is disposed over the first printed wiring board 37 and supported on the printed wiring board supports 36a and 36b. The first printed wiring board 37 has built therein a USB interface circuit, interface circuit for serial transfer and parallel transfer, etc. It is bonded to the bottom plate portion 25a of the lower case 25 with an adhesive or adhesive tape. The second printed wiring board 38 is electrically connected to the first printed wiring board 37 and has mounted therein a connector 41 for connection of the IC card 4, LED 39 which lights during operation, USB jack 40, etc. The second printed wiring board 38 has formed in each of the four corners a screw insertion hole 38a corresponding to the screw hole 32 in the upper case 24 and through-hole 30 in the lower case 25.

The connector 41 to be fixed to the second printed wiring board 38 will be described below with reference to FIGS. 6 and 7. The connector 41 includes a base 42 forming a part of the receptacle 46 for the IC card 4, cover 43 to be fixed on the base 42, lid assembly 44 which closes the insertion slot for the IC card 4, and an ejection member 45 for ejection of the IC card 4.

The base 42 and the bottom plate portion 24d of the upper case 24 form together a part of the IC card receptacle 46 for the IC card 4. The base 42 has provided at the rear end thereof connecting terminals 47 which are to be engaged on the terminal block 14 provided at the front end of the IC card 4. The connecting terminals 47 are equal in number to the contacts 16 of the terminal block 14, and more specifically they count ten in this embodiment. Each of the connecting terminals 47 is formed from an elastic electrically conductive piece. When the IC card 4 is set in the IC card receptacle 46, the connecting terminals 47 are engaged in the corresponding engagement concavities 15 in the terminal block 14 and elastically put into contact with the contacts 16, respectively. Thus, the IC card 4 is held in place in the IC card receptacle 46.

The cover 43 installed to the base 42 is formed by bending a sheet metal or the like, and it is assembled to the base 42 to define a compartment 51 for housing the IC card 4. The cover 43 also defines along with the base 42 an IC card insertion opening 48 for the IC card 4 at the side thereof opposite to that where the connecting terminals 47 are provided. The cover 43 has formed therein a generally U-shaped opening 49 contiguous to the IC card insertion opening 48. The U-shaped opening 49 is provided correspondingly to the generally U-shaped opening 28 in the main side 24a of the upper case 24 of the device body 21. When the fingerprint recognition IC card 4 is introduced through the insertion slot 27 in the upper cases 24, the fingerprint detector 13 on the IC card 4 is exposed to outside through the opening 49. Also, when the memory IC card 4 is inserted through the insertion slot 27 in the upper case 24, the label provided on the memory IC card 4 for write-down of the title of stored data or the like is exposed to outside through the opening 49.

The cover 43 has installed at the middle thereof the lid assembly 44 which prevents foreign matter such as dust from coming into the compartment 51 for the IC card 4, especially, to near the connecting terminals 47. The lid assembly 44 is integrally composed of a lid 52 to close the compartment 51, and a pivot 53 pressed by the front end of the IC card 4 to pivot the lid 52. On the other hand, the cover 43 has a pivot holder 54 through which the pivot 53 is penetrated. With the pivot 53 penetrated through the pivot holder 54, the lid 52 is installed to stay inside the compartment 51. With the coil portion of a helical torsion spring 55 being wound on the pivot 53 and one arm of the helical torsion spring 55 being engaged on an engagement portion 55a of the cover 43 while the other arm is engaged on the lid 52, the lid assembly 44 is forced in the direction of arrow $D_1$ in FIG. 6 to close the compartment 51. When no IC card 4 is inserted in the compartment 51, the lid assembly 44 is forced by the helical torsion spring 55 and thus closes the compartment 51 to prevent foreign matter such as dust from coming into the compartment 51. When the IC card 4 is inserted from the IC card insertion opening 48 into the compartment 51, the lid assembly 44 is pushed by the front end of the IC card 4 as shown in FIG. 7 and pivoted in a direction opposite to the direction of arrow $D_1$ in FIG. 6 against the force of the helical torsion spring 55, and thus the terminal block 14 is put into contact with the connecting terminals 47. That is, when the IC card 4 is inserted, the lid 52 is pivoted about the pivot 53 supported pivotably in the pivot holder 54 until it is generally parallel to the cover 43.

Figure 6:
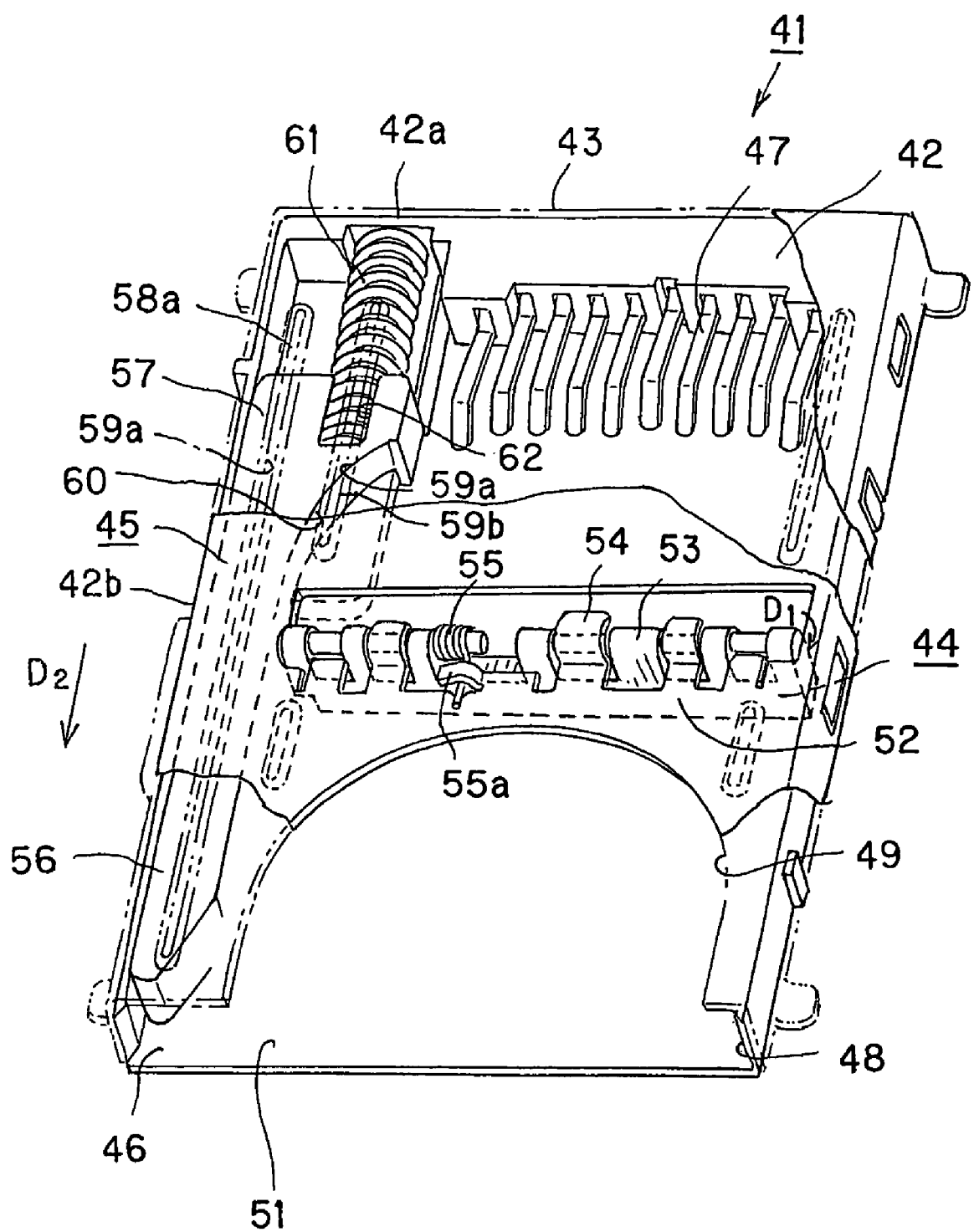
FIG. 6 is a perspective view of the connector member built in an IC card receptacle formed in the adapter device, with no IC card yet inserted in the IC card receptacle.

Further, there is provided one side, parallel to the directions in which the IC card 4 is inserted and ejected, of the compartment 51 defined by the base 42 and cover 43 an ejecting member 45 to eject the IC card 4 from inside the compartment 51, as shown in FIG. 6. The ejecting member 45 is formed to have a generally L shape to have a long movement guide portion 56 and a short movement limiting portion 57. The ejecting member 45 is movable in the direction of arrow $D_2$ in which the IC card 4 is ejected and in a direction opposite to the direction of arrow $D_2$ in which the IC card 4 is inserted, as shown in FIGS. 6 and 7. The movement guide 56 has formed therein a guide recess 59a projecting along the moving direction of the IC card 4 on the base 42 and in which a guide projection 58a is engaged. It should be noted that the movement limiting portion 57 has also formed therein a guide recess 59b projecting along the moving direction of the IC card 4 on the base 42 and in which a guide projection 58b is engaged.

The movement limiting portion 57 is positioned to be generally perpendicular to the direction in which the IC card 4 is inserted, and has a positioning portion 60 formed on a surface thereof which the IC card 4 is to abut. The positioning portion 60 is engaged on the chamfered corner 12 and concavity 12a of the IC card 4. That is to say, the ejecting member 45 positions the IC card 4 by means of a surface of the movement guide portion 56 opposite to the lateral side of the IC card 4 and positioning portion 60 of the movement limiting portion 57. With the IC card 4 being pressed, the ejecting member 45 is guided by the guide projections 58a and 58b and guide recesses 59a and 59b in moving in the direction opposite to the direction of arrow $D_2$ in FIGS. 6 and 7. Also, between the movement limiting portion 57 and rear wall 42a of the base 42, there is provided a helical compression spring 61 which forces the ejecting member 45 in the direction of arrow $D_2$ in FIGS. 6 and 7 in which the IC card 4 is ejected. The helical compression spring 61 is engaged at one end thereof in a concavity 62 in the movement limiting portion 57 and thus limited in position.

Figure 8:
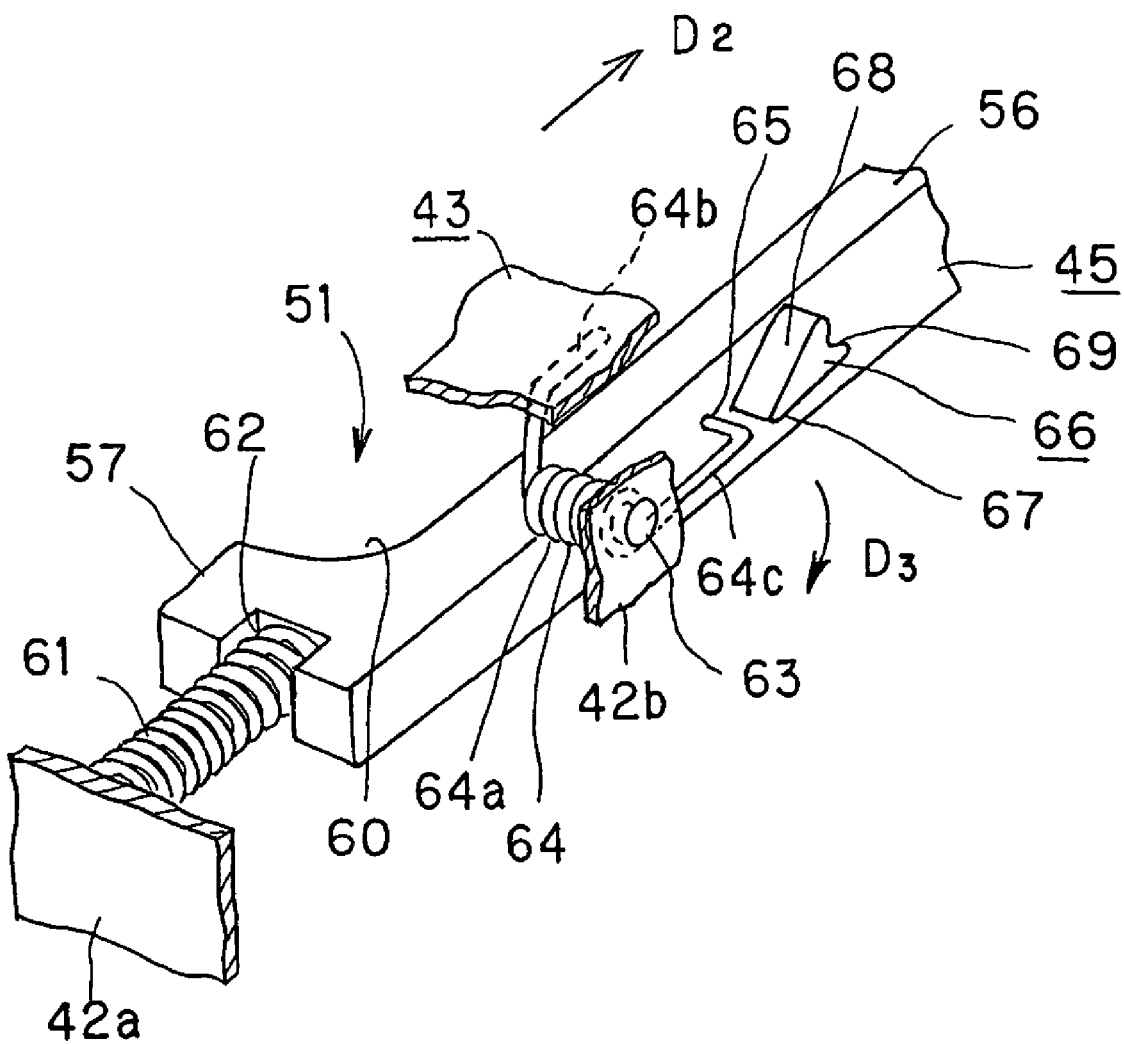
FIG. 8 is a perspective view of an ejecting member built in the connector.
Figure 9:
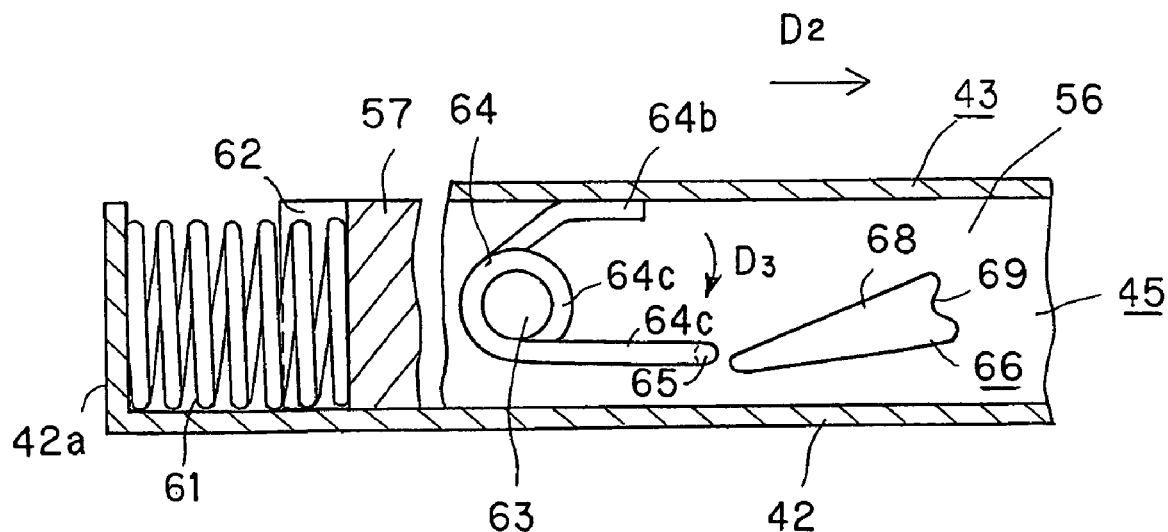
FIG. 9 is a side elevation of the ejecting member with no IC card yet inserted in the IC card receptacle.

As shown in FIGS. 8 and 9, a projection 63 is provided on one side wall 42b of the base 42 to project inwardly and has a control spring 64 fixed thereto. The control spring 64 is a helical torsion spring whose coil portion 64a wound on the projection 63 and rests at one end 64b thereof on the cover 43 to force the other end 64c to the base 42 in the direction of arrow $D_3$ in FIG. 10. The other end 64c of the control spring 64 is bent at an angle of about 90° inwardly to form an engagement portion 65. The engagement portion 65 is to be engaged on a catching projection 66 formed integrally with the movement guide portion 56 of the ejecting member 45.

The catching projection 66 is formed to have a generally isosceles triangle, and provided integrally on the surface of the movement guide portion 56 of the ejecting member 45 at the side of the side wall 42b of the base 42 so that an apex 67 of the catching projection 66 is positioned somewhat lower than the engagement portion 65 of the control spring 64 wound on the projection 63 on the side wall 42b of the base 42. On the surface of the catching projection 66 at the side of the cover 43, there is formed a cam portion 68 which forces up the engagement portion 65 of the control spring 64. The cam portion 68 is formed ascending from the apex 67 toward the cover 43. Also, in a portion of the catching projection 66 opposite to the apex 67, there is formed an engagement concavity 69 in which the engagement portion 65 of the control spring 64 is to be engaged.

In the above connector 41, when no IC card 4 is inserted, the engagement portion 65 of the control spring 64 is not engaged in the engagement concavity 69 in the catching projection 66 as shown in FIGS. 8 and 9. Therefore, the ejecting member 45 is forced by the helical compression spring 61 in the direction of arrow $D_3$ in FIGS. 8 and 9 and thus an IC card 4 can be inserted or ejected.

Figure 7:
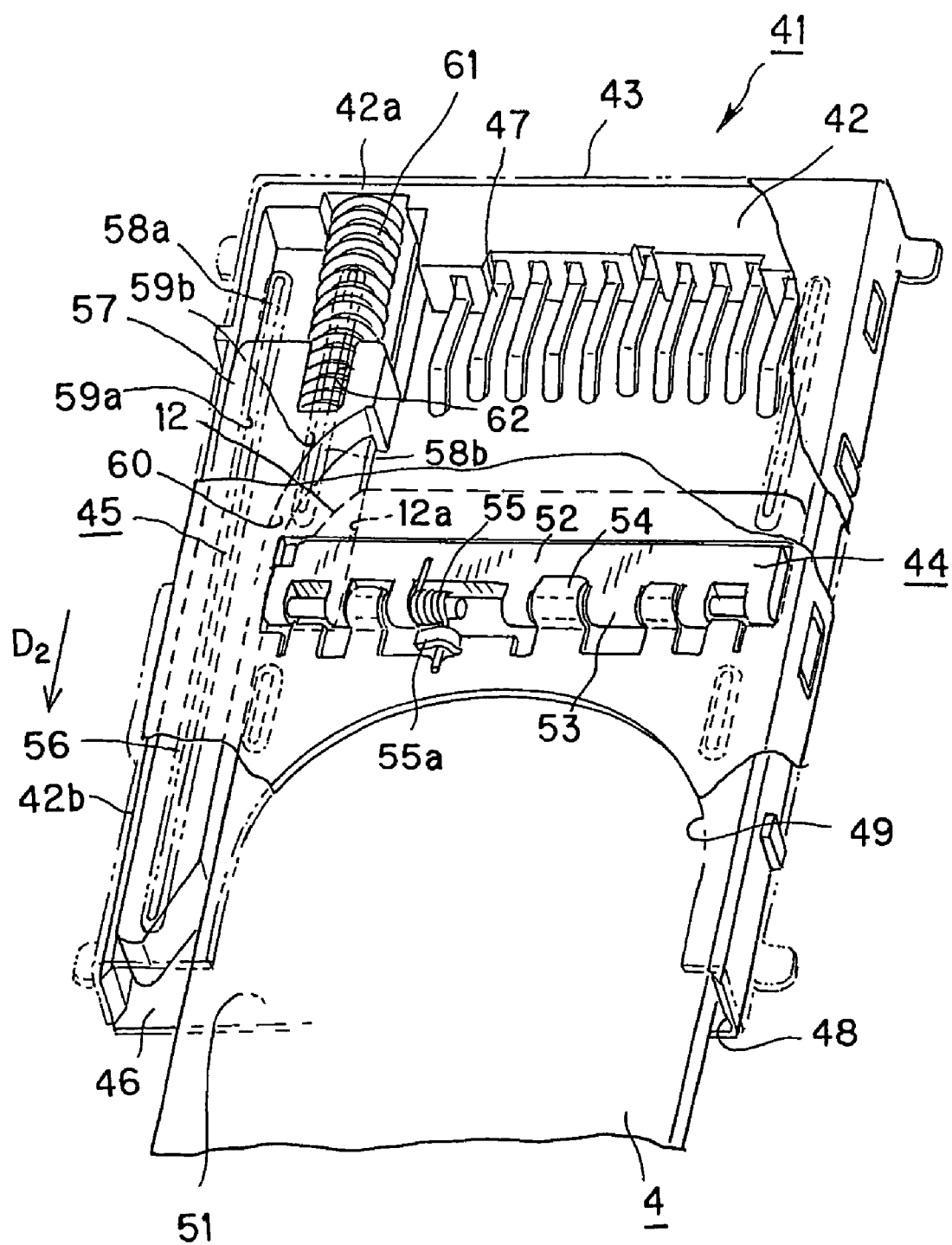
FIG. 7 is a perspective view of the connector member, with an IC card inserted in the IC card receptacle.

When an IC card 4 is inserted first at the terminal block 14 thereof into the compartment 51 while the ejecting member 45 is in the position in which the IC card 4 can be inserted or ejected, the front end thereof is positioned in place by the movement limiting portion 57 and positioning portion 60 of the ejecting member 45 as shown in FIG. 7. As the IC card 4 is further pressed, it is guided by the guide projections 58a and 58b and guide recesses 59a and 59b in moving in the direction opposite to the direction of arrow $D_2$ in FIGS. 8 and 9 against the force of the helical compression spring 61.

Figure 10:
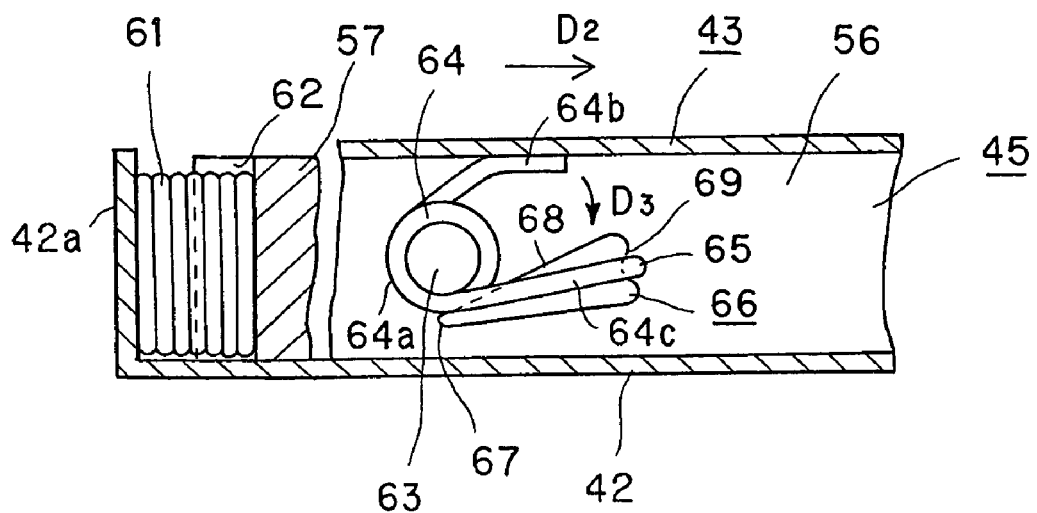
FIG. 10 is a side elevation of the ejecting member with an IC card inserted in the IC card receptacle.

Then, the engagement portion 65 of the control spring 64 moves from the apex 67 to the engagement concavity 69 along the cam portion 68 of the catching projection 66 provided integrally with the movement guide portion 56 of the ejecting member 45 against the force in the direction of arrow $D_3$ in FIGS. 9 and 10. When the engagement portion 65 of the control spring 64 has completely moved over the cam portion 68, it is engaged into the engagement concavity 69 in the catching projection 66 under the force of the control spring 64 itself as shown in FIG. 10. Thus, the ejecting member 45 is held in a position where the contacts 16 included in the terminal block 14 of the IC card 4 and connecting terminals 47 will be connected to each other. The connecting terminals 47 provided on the base 42 are engaged in the engagement concavities 15 of the terminal block 14 at the IC card 4 and put elastically into contact with the contacts 16, respectively, thus electrical connection is established between the connecting terminals 47 and contacts 16. It should be noted that in this condition, the IC card 4 is generally wholly received in the IC card receptacle 46 except for a rear-end portion which is exposed to outside. The rear-end portion of the IC card 4 is to be pressed for ejection from inside the IC card receptacle 46.

When the above-mentioned rear-end portion of the IC card 4 is pressed for ejection from the IC card receptacle 46, the ejecting member 45 is moved in the direction opposite to the direction of arrow $D_2$ in FIG. 10 against the force of the helical compression spring 61. Then, the catching projection 66 is disengaged from the engagement concavity 69 under the force in the direction of arrow $D_3$ in FIG. 10 and thus the engagement portion 65 of the control spring 64 is moved toward the side of the catching projection 66 at the side of the base 42. Because of the disengagement of the engagement portion 65 of the control spring 64 from the engagement concavity 69 of the catching projection 66, the ejecting member 45 is moved in the direction of arrow $D_2$ in FIG. 10 under the force of the helical compression spring 61 in a direction in which the terminal block 14 is disconnected to the connecting terminals 47, and returns to a first position where the IC card 4 is ejected. Thereafter, the IC card 4 is drawn out of the IC card receptacle 7.

For extraction from the connector 41 constructed as above, the IC card 4 has only to be pressed at the rear-end portion thereof. So, the IC card 4 can easily be ejected.

In the embodiment having been described in the foregoing, the IC card ejecting mechanism permits the user to eject the IC card 4 from the IC card receptacle 46 by pressing the IC card 4 itself at the rear-end portion. The ejecting mechanism may include an ejecting member which is to be operated by the user to eject the IC card 4 from inside the IC card receptacle 46.

The cover member 22 installed to the device body 21 composed of the upper and lower cases 24 and 25 covers the upper side of the device body 21 as shown in FIG. 5. It is formed by injection molding of a transparent or translucent synthetic resin such as a polycarbonate or the like. Since the cover member 22 is thus transparent or translucent, the main side 24a of the upper case 24 is visible from outside and the LED 39 as a pilot lamp is also visible through the LED lens 33a exposed to outside through the hole 33. Also, the label on the memory IC card 4 or the like is visible since it is exposed to outside through the opening 28 in the upper case 24.

The cover member 22 has formed in the longitudinal opposite edges thereof guide recesses 71a and 71b in which the guide rails 29a and 29b provided on the side wall portions 24b and 24c, respectively, of the upper cases 24 are engaged. In the front portions of the longitudinal edges of the cover member 22, there are formed cuts 72a and 72b in which the stoppers 31a and 31b of the upper case 24 are engaged. The cover member 22 is fitted to the upper case 24 from the rear end of the device body 21 with the guide rails 29a and 29b being engaged in the guide recesses 71a and 71b, respectively, until the stoppers 31a and 31b abut the inner ends of the cuts 72a and 72b, respectively.

Note that the cover member 22 is fitted to the upper case 24 from the rear end, not the front end, of the device body 21 and thus it will not close the IC card insertion slot 27 in the upper case of the device body 21. This is intended for allowing an imaging unit provided at the rear end of the IC card 4 or an antenna provided on the rear end of an IC card with GPS or a radio-communication interface IC card or the like to be exposed to outside even when such a card 4 is set in the receptacle 47 in the device body 21, for always exposing the insertion slot 27 to outside, and also for permitting easy insertion or ejection of the IC card 4.

As shown in FIG. 5, the support member 23 to support the device body 21 includes a base portion 74 and first and second leg portions 75 and 76 formed integrally with the base portion 74 in the form of a fork. Namely, the support member 23 is generally V-shaped. The support member 23 has attached, with an adhesive or the like, to the rear end thereof a nonslip member 77 formed from a rubber or the like to assure insertion or ejection of the IC card 4 with the adapter device 3 being placed on a surface of installation such as a desk top. The base portion 74 has provided at the end thereof a fixture 78 to which a hinge mechanism 81 which couples the support member 23 and the device body 21 to each other is fixed.

Figure 11:
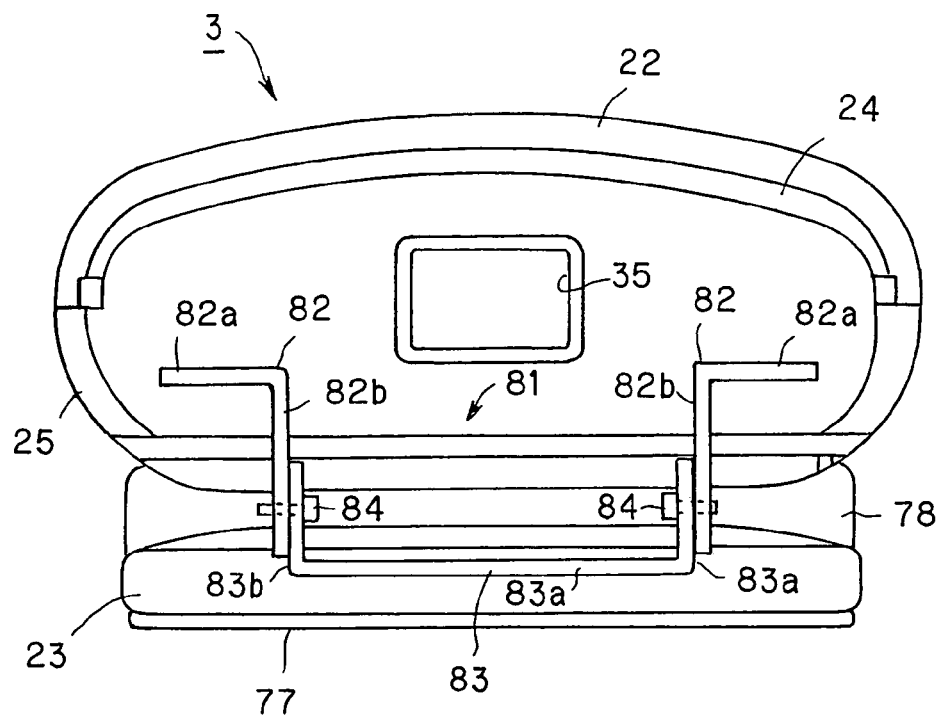
FIG. 11 is a rear view of the adapter device.

The above hinge mechanism 81 will be explained below with reference to FIGS. 5 and 11. As shown, the hinge mechanism 81 includes pivoting support members 82 fixed to the bottom plate portion 25a of the lower case 25 of the device body 21, and a pivoting member 83 pivotably installed to the pivoting support members 82. Each of the pivoting support members 82 in pair includes a fixing portion 82a for fixing to the bottom plate portion 25a of the lower case 25 and a pivoting support portion 82b for supporting the pivoting member 83 to be pivotable. The pivoting support member 82 is generally L-shaped. The fixing portion 82a has formed therein a screw insertion hole 82c for fixing to the bottom plate portion 25a of the lower case 25.

The pivoting member 83 includes a to-be-fixed portion 83a for fixing to the fixture 78 of the support member 23, and support portions 83b provided at opposite ends of the to-be-fixed portion 83a. The pivoting member 83 is generally C-shaped. The to-be-fixed portion 83a has formed therein fixing holes 83c for fixing to the fixture 78 of the support member 23. Each of the support portions 83b provided opposite to the to-be-fixed portion 83a is superposed on the inner surface of the pivoting support portion 82b of the pivoting support member 82, and secured to the corresponding pivoting support portion 82b with a shaft member 84.

Figure 12:
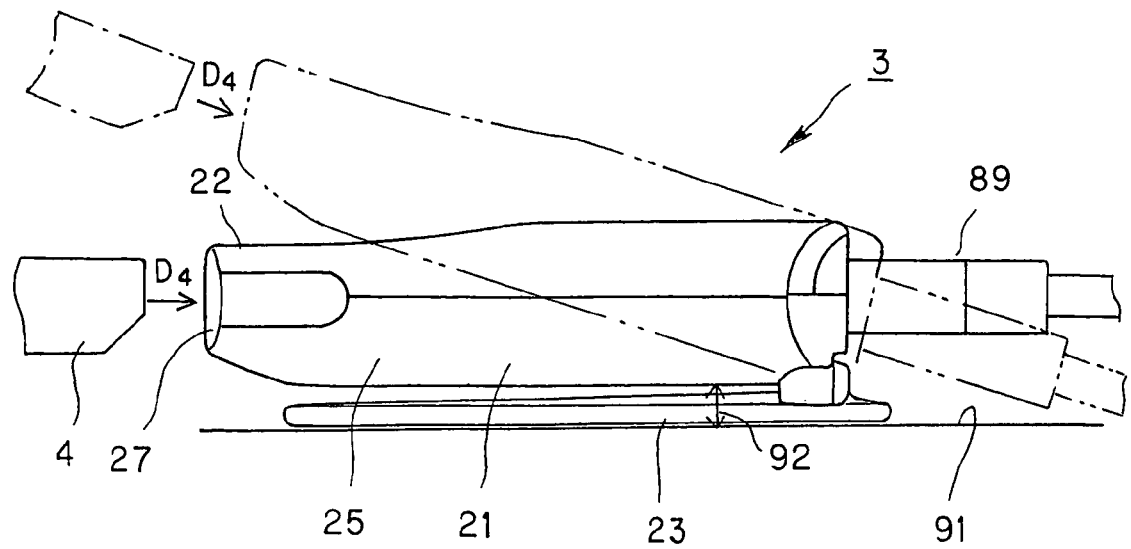
FIG. 12 is a side elevation of the adapter device.

The hinge mechanism 81 constructed as above has the pivoting support members 82 thereof installed to the bottom plate portion 25a of the lower case 25 and the pivoting member 83 installed to the support member 23. More particularly, the pivoting member 83 is fixed to the support member 23 with a set screw 85 inserted in each of the screw holes 83c formed in the to be-fixed portion 83a and screwed in screw holes 86 in the fixture 78 of the support member 23. Also, the fixing portion 83b of each pivoting support member 82 is placed on the insertion hole 87 in the fixture 78 of the support member 23 and secured by tightening a set screw 88. The set screw 88 is inserted through fixing hole 83c, then through the insertion hole 30 formed at the rear end of the bottom plate portion 25a of the lower case 25 and further through the screw insertion hole 38a formed at the rear end of the second printed wiring board 38, and screwed into the screw hole 32 formed at the rear end of the main side 24a of the upper case 24. Thus, the hinge mechanism 81 is installed to the device body 21 to project downward below the device body 21. As shown in FIG. 12, the device body 21 secured to the support member 23 with the hinge mechanism 81 disposed between them is pivoted about the hinge mechanism 81 within a range in which a USB plug 89 of a connecting cord connected to the USB jack 40 at the rear end of the device body 21 will not touch a surface 91 where the adapter device 3 is placed, for example, within a range of 15 deg., so that the IC card insertion slot 27 formed in the upper case 24 is elevated or lowered.

The adapter device 3 constructed as above is assembled as will be described below. First, the first printed wiring board 37 is installed to the bottom plate portion 25a of the lower case 25, and the second printed wiring board 38 having the connector 41 for connection of the IC card 4 installed thereto is disposed on the wiring board supports 36a and 36b. Further, the pivoting member 83 of the hinge mechanism 81 is installed to the bottom plate portion 25a of the lower case 25 with the set screw 85 inserted into each of the fixing holes 83c formed in the to be-fixed portion 83a and screwed in the screw hole 86 in the fixture 78 of the support member 23. Then, the upper case 24 is aligned with the lower case 25 having the first and second printed wiring boards 37 and 38 installed thereon. Thereafter, the front end of the upper case 24 is joined integrally to the lower case 25 with the set screw 88 being inserted into each of the insertion holes 30 provided at the front end of the bottom plate portion 25a of the lower case 25, further into the screw insertion hole 38a at the front end of the main side 24a of the upper case 24, and screwed into the screw hole 32 at the front end of the main side 24a of the upper case 24. Also, the rear end of the upper case 24 is joined integrally to the lower case 25 with the set screw 88 being inserted into each fixing hole 83c in the fixing piece 82a of the pivoting support member 82 included in the hinge mechanism 81, then into the insertion hole 30 provided at the rear end of the second printed wiring board 38, and screwed into the screw hole 32 at the rear end of the main side 24a of the upper case 24. The set screw 88 is used to fix the support member 23 and couple the upper and lower cases 24 and 25 to each other. The number of parts and number of assembling steps are thus reduced.

As shown in FIG. 12, the adapter device 3 constructed as above has connected to the USB jack 40 exposed to outside through the opening 35 at the rear end of the body 21 thereof the USB plug 89 of the USB cable connected to the computer main unit 5 in the information processing apparatus. With the device body 21 being supported on the support member 23, the adapter device 3 is placed on the surface of installation 91 such as a desk top or the like. The device body 21 is pivoted about the hinge mechanism 81 in relation to the support member 23 for the IC card insertion slot 27 formed in the device body 21 to be elevated or lowered. That is, when the IC card insertion slot 27, namely, the device body 21, is at the lower position as shown in FIG. 12, the IC card 4 is inserted first at the front end thereof where the terminal block 14 is provided into the IC card insertion slot 27 generally in parallel with the surface of installation 91 from the direction of arrow $D_4$ in FIG. 12. Also, when the IC card insertion slot 27, namely, the device body 21, is at the higher position, the IC card 4 is inserted first at the front end thereof into the IC card insertion slot 27 obliquely in relation to the surface of installation 91 from above in the direction of arrow $D_4$ in FIG. 12. Since the IC card insertion slot 27 for the IC card 4 can be elevated or lowered as above, the user can insert the IC card 4 into the insertion slot 27 from more than one direction, which contributes to an improved operability of the adapter device 3.

When the IC card 4 inserted from the insertion slot 27 is pressed by the user, the lid 52 in the connector 41 is pressed by the front end of the IC card 4 and thus pivoted about the pivot 53 pivotably supported by the pivoting holder 54 until the lid 52 is generally parallel to the cover 43 as shown in FIGS. 6 and 7. The front end of the IC card 4 is positioned by the movement limiting portion 57 of the ejecting member 45 and the positioning portion 60. As the IC card 4 is further pressed, it is guided by the guide projections 58a and 58b and guide recesses 59a and 59b in moving in the direction opposite to the direction of arrow $D_2$ in FIGS. 8 and 9 against the force of the helical compression spring 61.

Then, the engagement portion 65 of the control spring 64 moves from the apex 67 to the engagement concavity 69 along the cam portion 68 of the catching projection 66 provided integrally with the movement guide portion 56 of the ejecting member 45 against the force in the direction of arrow $D_3$ in FIGS. 9 and 10. When the engagement portion 65 of the control spring 64 has completely moved over the cam portion 68, it is engaged into the engagement concavity 69 in the catching projection 66 under the force of the control spring 64 itself as shown in FIG. 10. Thus, the ejecting member 45 is held in a position where the contacts 16 included in the terminal block 14 of the IC card 4 and connecting terminals 47 will be connected to each other. The connecting terminals 47 provided on the base 42 are engaged in the engagement concavities 15 of the terminal block 14 at the IC card 4 and put elastically into contact with the contacts 16, respectively, thus electrical connection is established between the connecting terminals 47 and contacts 16. When inserting the IC card 4, the adapter device 3 will be pressed by the user. Since the nonslip member 77 is provided on the bottom of the support member 23, however, the adapter device 3 will not be slid on the surface of installation 91 and thus the IC card 4 can easily be inserted into the adapter device 3.

In this adapter device 3, since the main side at the rear end of the IC card 4 is exposed to outside through the opening 28 in the main side 24a of the device body 21 and opening 49 in the connector 41 and the cover member 22 is transparent or translucent, the user can easily identify the type of an IC card 4 set in the adapter device 3. In case a fingerprint recognition IC card 4 is set in the IC card receptacle 46, the fingerprint detector 13 is exposed to outside through the opening 28 in the main side 24a of the device body 21 and opening 49 in the connector 41 and thus the user easily identify the type of the IC card inside the adapter device 3. For fingerprint registration or recognition with a fingerprint recognition IC card 4, the user can slide the cover member 22 to the rear end of the device body 21 and press the fingertip to the fingerprint detector 13 through the opening 28 in the main side 24a of the device body 21 and opening 49 in the connector 41 with the IC card 4 being set in place. Also, in case a memory IC card 4 is set in the adapter device 3, the label on the rear side of the IC card 4 is exposed to outside through the opening 28 in the main side 24a of the device body 21 and opening 49 in the connector 41 and thus the user can check the data stored in the IC card 4 by viewing through the transparent or translucent cover member 22. Since the opening 28 is formed in the main side 24a of the device body 21 and opening 49 is formed in the connector 41 and also the cover member 22 is formed from a transparent or translucent material, any one of IC cards 4 having different functions, respectively, can conveniently be used with the adapter device 3.

When the IC card 4 is pressed at the rear end thereof for ejection from the IC card receptacle 46, the ejecting member 45 is moved in the direction opposite to the direction of arrow $D_2$ in FIG. 10 against the force of the helical compression spring 61. Then, the engagement portion 65 of the control spring 64 is disengaged from the engagement concavity 69 under the force in the direction of arrow $D_3$ in FIG.

10 and thus the engagement portion 65 of the control spring 64 is moved toward the base 42 of the catching projection 66 under the force of the helical compression spring 61. Because of the disengagement of the engagement portion 65 of the control spring 64 from the engagement concavity 69 of the catching projection 66, the ejecting member 45 is moved in the direction of arrow $D_2$ in FIG. 10 under the force of the helical compression spring 61 in a direction in which the terminal block 14 is disconnected from the connecting terminals 47, and returns to a first position where the IC card 4 is ejected. Thereafter, the IC card 4 is drawn out of the IC card receptacle 46.

Since the support member 23 supporting the device body 21 has the nonslip member 77 provided on the bottom thereof, the IC card 4 can smoothly be inserted with the adapter device 3 not sliding on the surface of installation 91 whether the device body 21 is directed downward or upward.

When the device body 21 is pivoted in relation to the support member 23 until the insertion slot 27 is directed upward as shown in FIG. 12, the USB jack 40 at the rear end of the device body 21 will be directed toward the surface of installation 91. However, since the hinge mechanism 81 is provided to project from the bottom of the device body 21, there is a clearance 92 between the support member 23 and hinge device 81. Therefore, even when the device body 21 is pivoted in relation to the support member 23 until the insertion slot 27 is directed upward, the USB plug 89 of the USB cable can be connected to the USB jack 40.

In the above-mentioned adapter device 3, the cover member 22 is slidable in relation to the device body 21. According to the present invention, however, the cover member 22 may be supported at the rear end of the device body 21 pivotably by a hinge mechanism to permit the main side 24a of the device body 21 to be opened and closed.

Figure 13:
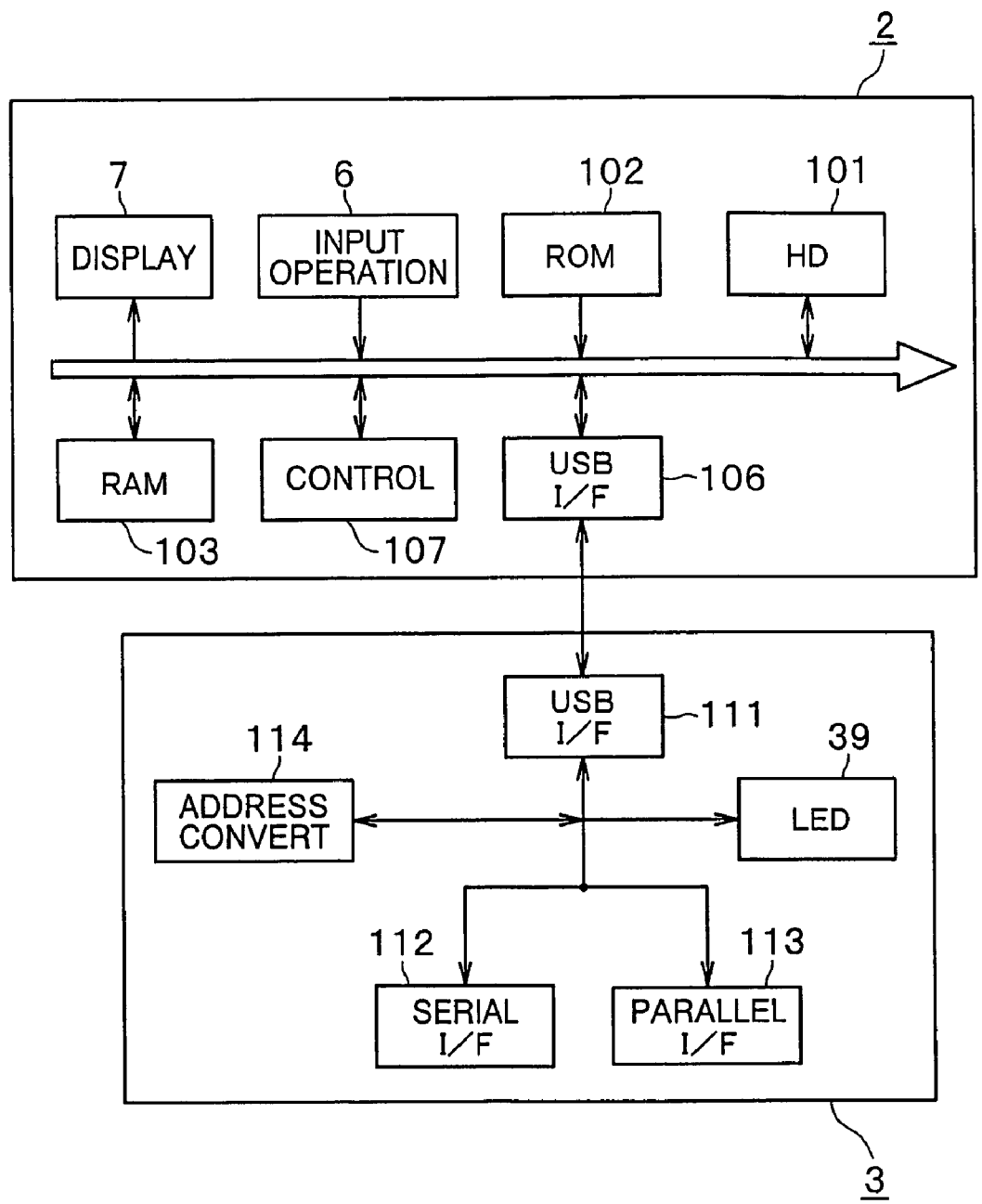
FIG. 13 is a block diagram of an information processing apparatus and the adapter device connected to the information processing apparatus.

Next, the circuit configurations of the adapter device 3 in which an IC card 4 is to be set and the information processing apparatus 2 to which the adapter device 3 is to be connected will be described with reference to FIG. 13. First, the information processing apparatus 2 will be explained. The information processing apparatus 2 is a desk-top personal computer, notebook-sized personal computer or the like. It includes a hard disk 101 to store various programs, processing data, etc., ROM 102 having control programs etc. stored therein, RAM 103 to which a program or processing data is loaded, an input operation unit 6 including a keyboard, mouse, ten keys, etc. to supply a command signal, display unit 7 which displays data being processed, such as CRT, LCD or the like, USB interface 106 for making data communications with any other peripheral apparatus such as the adapter device 3 according to the USB Standard, and a control unit 107 to control the system operation, such as CPU or the like. Based on a command signal supplied from the input operation unit 6, the control unit 107 reads a predetermined application program from the hard disk 101 to the RAM 103 and displays it on the display unit 7 while processing data. When the user tries to access a specific computer or a specific file stored in the hard disk 101 with the adapter device 3 being connected to the USB interface 106 and a fingerprint recognition IC card 4 being set in the adapter device 3, the control unit 107 makes a request for authentication by fingerprint recognition and displays it on the display unit 6. Only when the control unit 107 receives authentication data indicating that the user's fingerprint has been authenticated from the IC card 4, it allows the access to the specific computer or specific file stored in the hard disk 101. Also, when a memory IC card 4 is set in the adapter device 3, the control unit 107 displays data stored in the IC card 4, list of data titles, etc. on the display unit 7 and thus the user can operate the information processing apparatus 2 while viewing the display unit 7.

Next, the adapter device 3 which can be connected by USB to an information processing apparatus 2 will be explained with reference to FIG. 13. As shown, the adapter device 3 includes a USB interface 111 which makes data communications with the information processing apparatus 2 as a host apparatus according to the USB Standard, a serial interface 112 which makes serial transfer of data to and from an IC card 4 set in the IC card receptacle, a parallel interface 113 which makes parallel transfer of data to and from the IC card 4 set in the IC card receptacle, an address converter 114 which converts, when the IC card 4 set in the IC card receptacle is a memory IC card, a logical address in data processing into a physical address in a flash memory in the IC card 4, and an LED 39 which lights which the information processing apparatus 2 is accessing the IC card 4. This adapter device 3 can receive each of multiple types of IC cards different in function from each other in the IC card receptacle 46, and functions also as a transponder for the information processing apparatus 2 and IC card 4. With a memory IC card 4 being set in the receptacle 46, the adapter device 3 converts a logical address into a physical address when access is being made to the IC card 4. While the information processing apparatus 2 is accessing the IC card 4 set in the IC card receptacle 46, for example, the adapter device 3 turns on the LED 39 to inform the user that the information processing apparatus 2 is accessing the IC card 4, which is intended to prevent the user from erroneously taking out the IC card 4 from the IC card receptacle 46 while the information processing apparatus 2 is accessing the IC card 4.

The information processing apparatus 2 and adapter device 3 are connected to each other by an interface which can supply an electric power to the IC card 4, namely, "USB interface" in this embodiment. The USB interface can supply an electric power to a peripheral apparatus such as the adapter device 3 connected to the information processing apparatus 2 as the host apparatus. It supplies a DC current of 500 mA for example from the information processing apparatus 2 to the adapter device 3, whereby the LED 39 in the adapter device 3 is turned on and the IC card 4 set in the IC card receptacle 46 is powered.

Next, the circuit configuration of the IC card 4 to be set in the adapter device 3 will be described. A fingerprint recognition IC card 4 will be explained with reference to FIG. 14. As shown, the fingerprint recognition IC card 4 includes a fingerprint detector 121 on which the user's fingertip is to be pressed, a first memory 122 to store a fingerprint to be registered, a fingerprint checking unit 123 to check fingerprint data supplied from the fingerprint detector 121 with registered fingerprints stored in the first memory 122, a second memory 124 to store identification (ID) data indicative of the type of an IC card 4, serial number of the IC card 4 and information related with the fingerprint registered in the first memory 122, a serial interface 125 for serial transfer of authentication data to and from the adapter device 3, a parallel interface 126 for parallel transfer of authentication data to and from the adapter device 3, and a controller 127 to control the system operation.

The fingerprint detector 121 includes an imaging unit consisting of a CCD (charge-coupled device), line sensor, etc., and a backlight to illuminate a surface on which a fingertip is to be pressed. When a user's fingertip is pressed to the fingerprint detector 121, the backlight is turned on and the fingerprint is captured by the imaging unit. The fingerprint detector 121 extracts features such as branches and center of a dermatoglyph from the captured fingerprint. When registering a fingerprint, the fingerprint detector 121 supplies fingerprint features to the first memory 122. Thus, the first memory 122 stores, as fingerprint data, features of a fingerprint to be registered according to each ID number. Also, when recognizing a fingerprint, the fingerprint detector 121 supplies the fingerprint data to the fingerprint checking unit 123.

For recognition of the fingerprint of a user, the fingerprint checking unit 123 checks fingerprint data supplied from the fingerprint detector 121 with the fingerprint data stored in the first memory 122 for authentication of the user. When the fingerprint data from the fingerprint detector 121 is found coincident with the fingerprint data read from the first memory 122 and thus the user is authenticated, the fingerprint checking unit 123 supplies authentication data to the serial interface 125 or parallel interface 126. If the fingerprint data from the fingerprint detector 121 is found not coincident with the fingerprint data read from the first memory 122 and thus the user is not authenticated, the fingerprint checking unit 123 supplies non-authentication data to the serial interface 125 or parallel interface 126.

The second memory 124 stores information related with the fingerprint data registered in the first memory 122. More specifically, the second memory 124 has stored therein the name and ID number of a user having registered his or her fingerprint, serial number of the IC card and the like. When the fingerprint checking unit 123 has authenticated the user, the second memory 124 supplies data on the authenticated user along with the authentication data to the serial interface 125 or parallel interface 126.

The second memory 124 has stored therein ID data for identifying an IC card 4 set in the IC card receptacle 46 as a one for parallel/serial transfer or a one dedicated for serial transfer. Further, the second memory 124 has stored therein function ID data for identifying the IC card 4 as a one for fingerprint recognition or a one for memory. When the information processing apparatus 2 accesses the second memory 124, the latter supplies the identification data first to the information processing apparatus 2 which will thus be able to identify the type of the IC card 4.

The controller 127 controls the IC card 4 as a whole. For example, when the user presses the fingertip to the fingerprint detector 121, the controller 127 drives the fingerprint detector 121, and controls write of fingerprint data for registration to the first memory 122, write of information on fingerprint data for registration to the second member 24, read of the information on the fingerprint data, and read of identification data from the second memory 124. The controller 127 selects an interface for use correspondingly to control data from the information processing apparatus 2, that is, it selects either the serial interface 125 or parallel interface 126.

Figure 15:
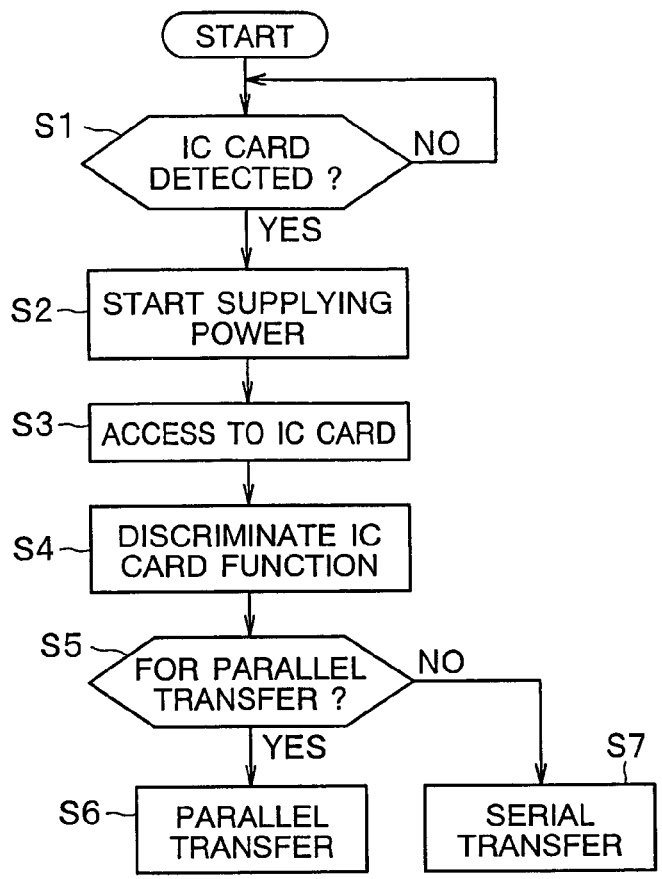
FIG. 15 shows a flow of operations made in the information processing apparatus with the fingerprint recognition IC card being set in the IC card receptacle.

When the aforementioned fingerprint recognition IC card 4 is set in the adapter device 3, the information processing apparatus 2 operates as will be described below with reference to FIG. 15. When the IC card 4 is set in the IC card receptacle 46 of the adapter device 3 being connected by the USB interface to the information processing apparatus 2, the information processing apparatus 2 goes to step S1 where it will detect a potential at the IC card insertion detecting contacts and judge whether the potential is equal to that on the Vss contacts. When the potential at the IC card insertion detecting contacts is determined to be equal to that on the Vss contacts, the information processing apparatus 2 determines that the IC card is set in the IC card receptacle 46 of the adapter device 3, and goes to step S2. If the potential at the IC card insertion detecting contacts is determined not to be equal to that on the Vss contacts, the information processing apparatus 2 determines that no IC card 4 is set in the IC card receptacle 46 of the adapter device 3, and returns to step S1 where it will repeat the due operations.

In step S2, the information processing apparatus 2 starts supplying a power to the IC card 4 set in the adapter device 3 via a USB cable, and goes to step S3 where it will start accessing the IC card 4. At this time, supplied with the power supplied via the USB cable from the information processing apparatus 2, the pilot lamp 39 on the adapter device 3 is turned on. Thus, the user can visually confirm that the access to the IC card 4 is started. Then, the information processing apparatus 2 accesses a specific address in the second memory 124 in the IC card 4. That is, the information processing apparatus 2 supplies a serial protocol bus state signal BS and serial clock SCLK to the IC card 4, and accesses the second memory 124 to read IC card function ID data via a data line (DATA0) used in the serial transfer and parallel transfer.

Then the information processing apparatus 2 goes to step S4 where it will judge based on the IC card function ID data read from the second memory 124 which the IC card 4 set in the adapter device 3 is, a one for fingerprint recognition or a one for memory. When the information processing apparatus 2 determines the IC card 4 set in the adapter device 3 to be a fingerprint recognition one, it goes to step S5. If the information processing apparatus 5 determines the IC card 4 not to be any fingerprint recognition one, it makes operations corresponding to an IC card 4 having other function.

In step S5, the information processing apparatus 2 judges based on the communication ID data read from the second memory 124 which the IC card 4 set in the adapter device 3 is, a one for parallel transfer or a one only for serial transfer. When the information processing apparatus 2 determines the IC card 4 to be for parallel transfer, it goes to step S6. If it determines the IC card 4 to be a one only for serial transfer, it goes to step S7.

Having determined the IC card 4 set in the adapter device 3 to be for parallel transfer, the information processing apparatus 2 switches the interface to the parallel interface 126 by means of the controller 127 in step S6 for parallel transfer of data for subsequent operations such as fingerprint registration, check, etc. More particularly, the parallel data transfer is done along a first data line (DATA1), second data line (DATA2) and third data line (DATA3) of the parallel interface.

Having determined the IC card 4 set in the adapter device 3 to be only for serial transfer, the information processing apparatus 2 switches the interface to the serial interface 125 by means of the controller 127 in step S7 for serial transfer of data for subsequent operations such as fingerprint registration, check, etc. More specifically, the serial data transfer is done along the data line (DATA0).

Figure 16:
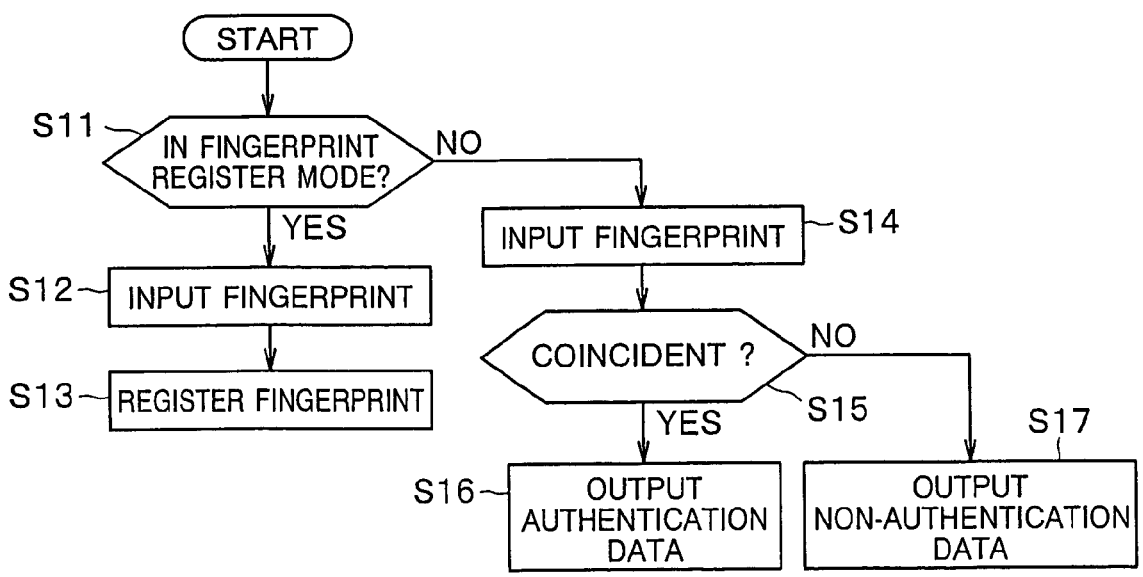
FIG. 16 also shows a flow of operations made for fingerprint registration and recognition in the fingerprint recognition IC card.

The fingerprint recognition IC card 4 operates for fingerprint registration and check as will be described with reference to FIG. 16. First in step S11, when the user operates the input operation unit 8, the controller 127 in the IC card 4 judges whether a fingerprint register command has been supplied from the information processing apparatus 2. When the fingerprint register command has been supplied, the controller 127 goes to step S12 where it will operate for the fingerprint registration. If no fingerprint register command has been supplied, the controller 127 goes to step S14 for the fingerprint registration.

When in the fingerprint registration mode, the IC card 4 is supplied with a user's finger data in step S12. More specifically, the user slides, to the rear end, the cover member 22 installed to the device body 21 of the adapter device 3 in which the fingerprint recognition IC card 4 is set, introduces the fingertip into the adapter device 3 from the opening 28 formed in the upper case 24 of the device body 21 and opening 49 in the connector 41, and presses the fingertip to the fingerprint detector 121. Then, the fingerprint detector 121 will detect the user's fingerprint, the imaging unit captures the fingerprint and extracts features such as branches and center of a dermatoglyph from the captured fingerprint to generate fingerprint data.

In step S13, the controller 127 in the IC card 4 assigns an ID number to the fingerprint data, and controls the fingerprint detector 121 to supply the fingerprint data to the first memory 122. Thus, the first memory 122 stores, namely, registers the fingerprint data on the user.

At this time, the IC card 4 can store, in the second memory 124, information related with the registered fingerprint data in association with the fingerprint data ID number. Namely, the user enters the name and ID number of the user by operating the input operation unit 6 at the information processing apparatus 2, and the input data is recorded to the second memory 124 in the IC card 4 via the serial interfaces 112 and 125 or parallel interfaces 113 and 126.

Next, how to check a fingerprint will be described. When no fingerprint register command has been supplied to the IC card 4 in step S11, the IC card 4 will be supplied with a fingerprint of a user trying to use the information processing apparatus 2 in step S14. More specifically, the user slides, to the rear end, the cover member 22 installed to the device body 21 of the adapter device 3 in which the fingerprint recognition IC card 4 is set, introduces the fingertip into the adapter device 3 from the opening 28 formed in the upper case 24 of the device body 21 and opening 49 in the connector 41, and presses the fingertip to the fingerprint detector 121. Then, the fingerprint detector 121 will detect the user's fingerprint, the imaging unit captures the fingerprint and extracts features such as branches and center of a dermatoglyph from the captured fingerprint data, and supplies the data to the fingerprint checking unit 123.

In step S15, the checking unit 123 in the IC card 4 reads registered fingerprint data from the first memory 122, and checks the fingerprint data read from the first memory 122 with fingerprint data supplied from the fingerprint detector 121. Then, when the fingerprint checking unit 123 confirms that the fingerprint data supplied from the fingerprint detector 121 coincides with the fingerprint data read from the first memory 122, the IC card 4 goes to step S16. If the result of checking is negative, the IC card 4 will go to step S17.

When the fingerprint data supplied from the fingerprint detector 121 coincides with the fingerprint data read from the first memory 122, the IC card 4 determines that the user trying to access the information processing apparatus 2 can have been authenticated, and supplies, in step S16, authentication data to the information processing apparatus 2 via the serial interfaces 112 and 125 or parallel interface 113 and 126. Having received the authentication data, the information processing apparatus 2 is ready for use by the authenticated user.

When the fingerprint data supplied from the fingerprint detector 121 does not coincide with the fingerprint data read from the first memory 122, the IC card 4 determines that the user trying to access the information processing apparatus 2 can not have been authenticated, and supplies, in step S17, non-authentication data to the information processing apparatus 2 via the serial interfaces 112 and 125 or parallel interface 113 and 126. Having received the non-authentication data, the information processing apparatus 2 is inhibited from being used by the non-authenticated user.

In the above example, the fingerprint recognition is used to limit the user's access to the information processing apparatus 2. In addition, however, the fingerprint recognition may be used to limit any user's access to a specific file stored in an external storage unit such as a hard disk 101, an optical disk or the like, installed in the information processing apparatus 2.

Next, the memory IC card 4 compatible with the adapter device 3 will be described with reference to FIG. 17. As shown, the memory IC card 4 includes a single flash memory 131 or a plurality of flash memories 131 to store data, a memory controller 132 to control write and read to and from the flash memory 131, an error correction unit 133 to add an error correction code to data stored in the flash memory 131 and decode an error correction code in data read from the flash memory 131, a memory 134 having stored therein various parameters for data write or read, a buffer memory 135 to provisionally store data for storage into the flash memory 131, an address converter 136 to make a conversion between a logical address in data processing and a physical address in the memory, a serial interface 137 to transfer data to and from the adapter device 3 by serial transfer, a parallel interface 138 to transfer data to and from the adapter device 3 by parallel transfer, and a controller 139 to control the system operation.

The memory 134 has stored therein ID data for identifying which an IC card 4 set in the IC card receptacle 46 is, a one for parallel/serial transfer or a one only for serial transfer. Also, the memory 134 has stored therein IC card function ID data indicative of which the IC card is, a fingerprint recognition IC card or a memory IC card. When the information processing apparatus 2 accesses the IC card function ID data, the memory 134 supplies the ID data first to the information processing apparatus 2 which will thus be able to identify the type of the IC card 4. Further, the memory 134 has stored therein address conversion ID data indicating whether the IC card 4 includes the address converter 136 or not.

The controller 127 selects an interface used correspondingly to control data supplied from the information processing apparatus 2, namely, it selects either the serial interface 137 or the parallel interface 138.

In the memory IC card 4 constructed as above, when a logical address is supplied from the information processing apparatus 2, the controller 139 controls the address converter 136 to convert the logical address into a physical address to access the flash memory 131, and writes data to a specific address or reads data stored in a specific address.

Figure 18:
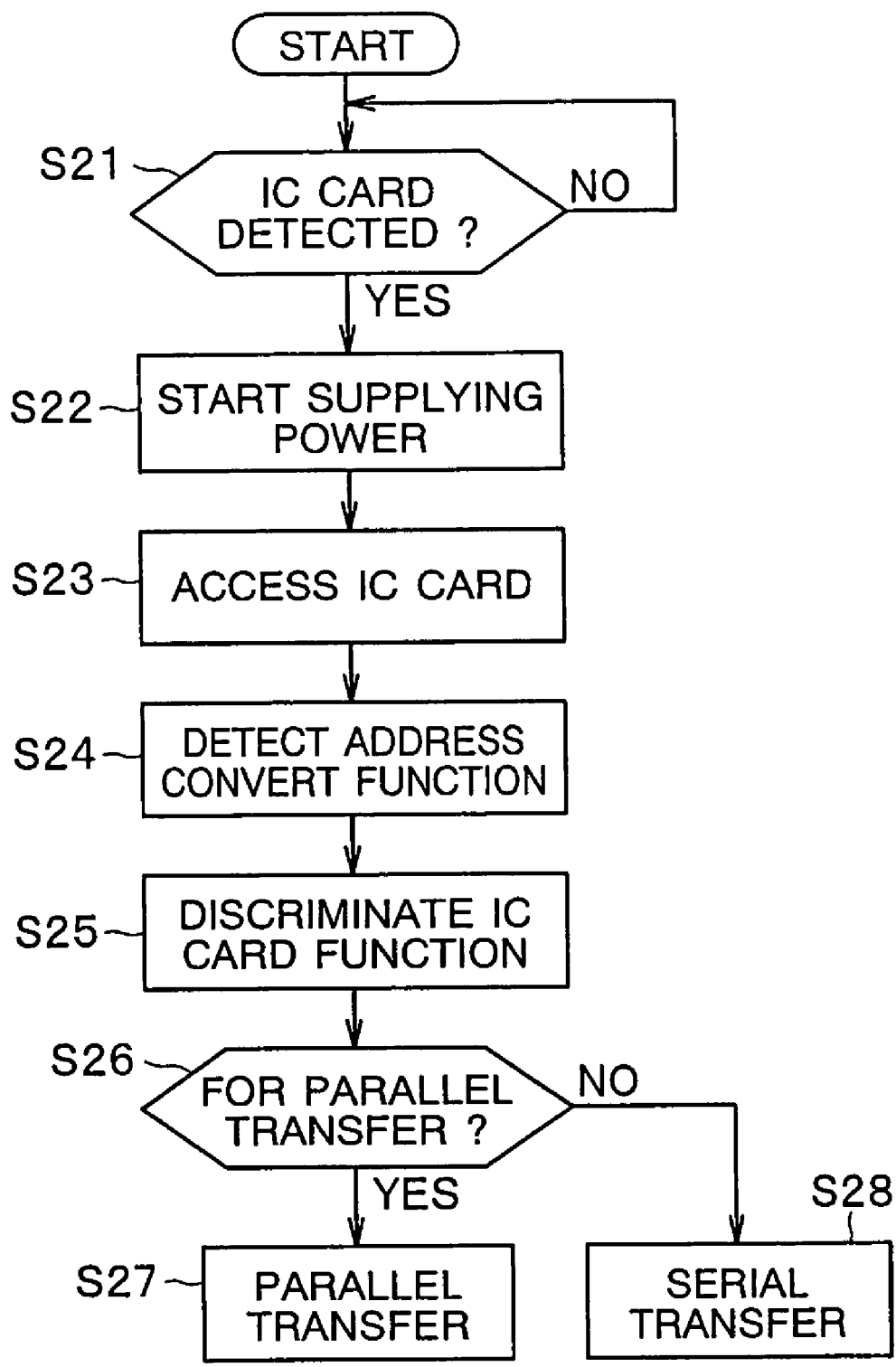
FIG. 18 shows a flow of operations made for data read or write from or to the memory IC card.

Next, operations made in the memory IC card for data read and write will be described with reference to FIG. 18. When the aforementioned memory IC card 4 is set in the adapter device 3, the information processing apparatus 2 operates as will be described below with reference to FIG. 17. When the IC card 4 is set in the IC card receptacle 46 of the adapter device 3 being connected by the USB cable to the information processing apparatus 2, the information processing apparatus 2 goes to step S21 where it will detect a potential at the IC card insertion detecting contacts and whether the potential is equal to that on the Vss contacts.

When the potential at the IC card insertion detecting contacts is determined to be equal to that on the Vss contacts, the information processing apparatus 2 determines that the IC card is set in the IC card receptacle 46 of the adapter device 3, and goes to step S22. If the potential at the IC card insertion detecting contacts is determined not to be equal to that on the Vss contacts, the information processing apparatus 2 determines that no IC card 4 is set in the IC card receptacle 46 of the adapter device 3, and returns to step S1 where it will repeat the due operations.

In step S22, the information processing apparatus 2 starts supplying a power to the IC card 4 set in the adapter device 3 via the USB cable, and goes to step S23 where it will start accessing the IC card 4. At this time, supplied with the power supplied via the UBS cable from the information processing apparatus 2, the LED 39 on the adapter device 3 is turned on. Thus, the user can visually confirm that the access to the IC card 4 is started. Then, the information processing apparatus 2 accesses a specific address in the memory 134 in the IC card 4. That is, the information processing apparatus 2 supplies a serial protocol bus state signal BS and serial clock SCLK to the IC card 4, and accesses the memory 134 to read IC card function ID data via a data line (DATA0) used in the serial transfer and parallel transfer.

In step S24, the information processing apparatus 2 judges based on address conversion ID data read from the memory 134 whether the IC card 4 set in the adapter device 3 includes the address converter 136 or not. When the IC card 4 in the adapter device 3 has the address conversion function, the information processing apparatus 2 will access the flash memory 131 by a logical address. When the IC card 4 set in the adapter device 3 has no address conversion function, the information processing apparatus 2 will convert a logical address into a physical address by means of the address converter 114 provided in the adapter device 3 and access, by a physical address, the flash memory 131 in the IC card 4 having no address conversion function.

Then the information processing apparatus 2 goes to step S25 where it will judge based on the IC card function ID data read from the memory 134 whether the IC card 4 set in the adapter device 3 is a memory IC card. When the information processing apparatus 2 determines the IC card 4 set in the adapter device 3 to be a memory IC card, it goes to step S26. If the information processing apparatus 5 determines the IC card 4 not to be any memory IC card, it makes operations corresponding to an IC card 4 having other function.

In step S26, the information processing apparatus 2 judges based on the communication ID data read from the memory 134 which the IC card 4 set in the adapter device 3 is, a one for parallel transfer or a one only for serial transfer. When the information processing apparatus 2 determines the IC card 4 to be for parallel transfer, it goes to step S27. If it determines the IC card 4 to be a one only for serial transfer, it goes to step S28.

Having determined the IC card 4 set in the adapter device 3 to be for parallel transfer, the information processing apparatus 2 switches the interface to the parallel interface 138 by means of the controller 139 in step S27 for parallel transfer of data to and from the flash memory 131. Then, the parallel data transfer is done along a first data line (DATA1), second data line (DATA2) and third data line (DATA3) of the parallel interface.

Having determined the IC card 4 set in the adapter device 3 to be only for serial transfer, the information processing apparatus 2 switches the interface to the serial interface 137 by means of the controller 139 in step S28 for serial transfer of data to and from the flash memory 131. The serial data transfer is done along the data line (DATA0).

The access to the flash memory 131 in steps S27 and S28 has to be done by a physical address. On this account, when the IC card 4 has the address conversion function, the access to the flash memory 131 is done by converting a logical address into a physical address by means of the address converter 136 in the IC card 4. In case the IC card 4 has no address conversion function, the access to the flash memory 131 is done by converting a logical address into a physical address by means of the address converter 114 in the adapter device 3. The memory IC card 4 stores, into the flash memory 131, data transferred from the information processing apparatus 2 to the flash memory 131 by the serial or parallel transfer, and data stored in the flash memory 131 is transferred to the information processing apparatus 2.

The adapter device 3 having been described in the foregoing is capable of data transfer by two modes of communication; serial transfer and parallel transfer. Namely, it can send data to, and receive data from, a conventional IC card by the serial transfer, and also can rapidly send data to, and receive data from, a parallel transfer type IC card 4 by the parallel transfer. When the adapter device 3 has a memory IC card 4 set therein, the information processing apparatus 2 can access to the memory IC card 4 by a logical address and make a rapid addressing since the IC card 4 includes the address converter 114.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, the adapter device according to the present invention includes a body in which an IC card is installable, and has the cover member installed to one main side of the device body to be openable. The main side of the device body can be opened or closed by operating the cover member according to the type of an IC card set in the IC card receptacle. Thus the adapter device is usable easily and conveniently with an IC card of any type set in the IC card receptacle.

The invention claimed is:

1. An adapter device comprising:
   a device body having an IC card insertion slot formed at a side thereof and a receptacle formed contiguously to the IC card insertion slot and into which an IC card is set;
   a cover member provided over one main side of the device body slidably on the device body;
   an interface for data transfer between an IC card set in the IC card receptacle and a host apparatus; and
   a support member to support the device body by a hinge mechanism at a side opposite to the IC card insertion slot to be pivotable in relation to a surface on which the device body is installed,
   wherein the hinge mechanism includes:
   a pivoting support member having a pivoting support portion installed on the device body to project from the latter; and a pivot member installed to the support member and supported pivotably in relation to the pivoting support portion.

2. An adapter device comprising:

a device body having an IC card insertion slot formed at a side thereof and a receptacle formed contiguously to the IC card insertion slot and into which an IC card is set;

a cover member provided over one main side of the device body slidably on the device body;

an interface for data transfer between an IC card set in the IC card receptacle and a host apparatus; and a support member to support the device body by a hinge mechanism at a side opposite to the IC card insertion slot to be pivotable in relation to a surface on which the device body is installed, wherein:

the device body includes an address conversion block to convert a logical address in data processing into a physical address in a memory when an IC card with a memory is set in the IC card receptacle; and the address conversion block converts, when the host apparatus accesses the memory in the IC card by a logical address, the logical address into a physical address for access to the memory in the IC card.

* * * * *